United States Patent
DeLuca et al.

(10) Patent No.: US 10,565,761 B2
(45) Date of Patent: Feb. 18, 2020

(54) AUGMENTED REALITY Z-STACK PRIORITIZATION

(71) Applicant: Wayfair LLC, Boston, MA (US)

(72) Inventors: Lisa Seacat DeLuca, Baltimore, MD (US); Jeremy A. Greenberger, San Jose, CA (US); Zachary M. Greenberger, San Jose, CA (US)

(73) Assignee: Wayfair LLC, Boston, MA (US)

( * ) Notice: Subject to any disclaimer, the term of this patent is extended or adjusted under 35 U.S.C. 154(b) by 0 days.

(21) Appl. No.: 15/834,125

(22) Filed: Dec. 7, 2017

(65) Prior Publication Data

US 2019/0180483 A1  Jun. 13, 2019

(51) Int. Cl.
  *G06T 11/60* (2006.01)
  *G06F 3/01* (2006.01)
  *G02B 27/01* (2006.01)

(52) U.S. Cl.
  CPC .......... *G06T 11/60* (2013.01); *G02B 27/0172* (2013.01); *G06F 3/013* (2013.01); *G02B 2027/014* (2013.01); *G02B 2027/0138* (2013.01); *G02B 2027/0178* (2013.01)

(58) Field of Classification Search
  CPC ........ G06T 11/60; G06T 19/006; G06F 3/011; G06F 3/012; G06F 3/013; G02B 2027/014; G02B 2027/0141
  See application file for complete search history.

(56) References Cited

U.S. PATENT DOCUMENTS

| | | | |
|---|---|---|---|
| 5,040,888 | A | 8/1991 | Bonham |
| 5,528,735 | A | 6/1996 | Strasnick et al. |
| 6,329,986 | B1 | 12/2001 | Cheng |
| 7,109,998 | B2 | 9/2006 | Smith |

(Continued)

FOREIGN PATENT DOCUMENTS

WO    2014099231    6/2014

OTHER PUBLICATIONS

Anonymously; "Augmented Reality Overlays Interfering with Physical Objects in the Real World"; ht tp://ip.com/ PCOM/000245242D; Feb. 19, 2016. (Year: 2016).*

(Continued)

*Primary Examiner* — Jeffery A Brier
(74) *Attorney, Agent, or Firm* — Wolf, Greenfield & Sacks, P.C.

(57) ABSTRACT

A system, method and computer program products for prioritizing the stacking order of virtualized objects within a z-index of an augmented reality system by presenting the most valuable, relevant or important information more prominently. Prioritization of the virtualized object may occur dynamically, as a function of the user's primary focus. As the user's primary focus changes from one physical object to another, the stacking order may change in response to the shift in focus. Embodiments may use one or more techniques to identify the primary focus such as the direction of the user's gaze, the focal point of one or more visual recording systems (i.e. cameras) or the user may manually highlight one or more objects via the HUD or interface of the augmented display system. The disclosed embodiments allow for the more predominate or relevant virtualized objects within the augmented display to receive priority, unobscured viewing by the user.

20 Claims, 15 Drawing Sheets

(56) References Cited

U.S. PATENT DOCUMENTS

| | | | |
|---|---|---|---|
| 7,720,932 B2 | 5/2010 | Wei et al. | |
| 8,448,092 B2 | 5/2013 | Deluca et al. | |
| 8,743,145 B1 | 6/2014 | Price | |
| 9,129,430 B2 | 9/2015 | Salter et al. | |
| 9,257,089 B2 | 2/2016 | Ur | |
| 9,563,983 B2 | 2/2017 | Bean et al. | |
| 9,710,970 B2 | 7/2017 | Jung et al. | |
| 2004/0045204 A1 | 3/2004 | Miano et al. | |
| 2004/0047013 A1* | 3/2004 | Cai | G03H 1/00 359/15 |
| 2013/0145304 A1 | 6/2013 | Deluca et al. | |
| 2013/0156318 A1* | 6/2013 | Beckman | G06T 11/206 382/190 |
| 2014/0168262 A1 | 6/2014 | Forutanpour et al. | |
| 2014/0232750 A1* | 8/2014 | Price | G06T 19/006 345/633 |
| 2014/0247281 A1 | 9/2014 | Ellenby | |
| 2015/0339453 A1 | 11/2015 | Richards et al. | |
| 2016/0027221 A1 | 1/2016 | Blanchflower et al. | |
| 2016/0042563 A1* | 2/2016 | Ur | G06Q 50/01 345/633 |
| 2016/0049013 A1* | 2/2016 | Tosas Bautista | G06T 19/006 345/633 |
| 2016/0217623 A1* | 7/2016 | Singh | G09G 3/003 |
| 2016/0259608 A1* | 9/2016 | Bean | G06T 7/73 |
| 2016/0259977 A1 | 9/2016 | Asbun et al. | |
| 2016/0283793 A1* | 9/2016 | Leckey | G06K 9/00221 |
| 2017/0060230 A1* | 3/2017 | Faaborg | G06F 3/011 |
| 2017/0124769 A1 | 5/2017 | Saito | |

OTHER PUBLICATIONS

Anonymously; "Displaying Large Models in Augmented Reality"; ht tp://ip.com/IPCOM/000236647D; May 7, 2014. (Year: 2014 ).*

AWE 2016; Augmented Reality Glasses with Eye Tracking: Retrieved from the Internet Oct. 24, 2017; URL: http://singlegadget.com/awe-2016-augmented-reality-glasses-eyetracking/; 3 pages.

Borkowski, Stanislaw et al.; Spatial Control of Interactive Surfaces in an Augmented Environment; International Workshop on Design, Specification, and Verification of Interactive Systems; Engineering Human Computer Interaction and Interactive Systems; 2004; pp. 228-244.

Butkiewicz, Michael et al.; Klotski: Reprioritizing Web Content to Improve User Experience on Mobile Devices; 12th USENIX Symposium on Networked Systems Design and Implementation; May 4-6, 2015; pp. 438-453.

Friedman, Mark J.; Updated List of IBM Patents or Patent Applications Treated as Related; Jan. 22, 2018; 1 page.

IBM Marketplace Watson; Visual Recognition; URL: https://www.ibm.com/watson/services/visual-recognition/; Sep. 2017; 6 pgs.

Anonymously; "Method for Remote Object Search and Viewing Using Augmented Reality Glasses"; http://ip.com/IPCOM/000240512D; Feb. 4, 2015.

Anonymously; "Situated Augmented Reality"; http://ip.com/IPCOM/000239026D; Oct. 2, 2014.

Bilenko, Mikhail et al.; Adaptive Product Normalization: Using Online Learning for Record Linkage in Comparison Shopping; Proceedings of the 5th International Conference on Data Mining; Nov. 2005; pp. 58-65.

Kalkofen D. et al.; Visualization Techniques for Augmented Reality. Chapter 3 in: Furht B. (eds) Handbook of Augmented Reality; Jul. 13, 2011; pp. 65-98.

Neumann, U. et al.; Tracking for Augmented Reality on Wearable Computers; Virtual Reality, vol. 3, Issue 3; Sep. 1998; pp. 167-175.

Anonymously; System and method of reorganizing text in image (screen shot or picture) with the image is being resized; IP.com; IPCOM000215227D; Feb. 22, 2012; 13 pages.

Watfa, Allie et al.; A Method and System for Displaying a Personalized Advertisement Containing User Content; IP.com; IPCOM000237438D; Jun. 18, 2014; 3 pages.

Jain, Puneet et al.; OverLay: Practical Mobile Augmented Reality; Proceedings of the 13th Annual International Conference on Mobile Systems, Applications, and Services; May 18-22, 2015; 14 pages.

Zhu, Wei et al.; Personalized In-store E-Commerce with the PromoPad: an Augmented Reality Shopping Assistant; Electronic Journal for E-Commerce Tools and Applications 1.3; Jan. 2004; pp. 1-19.

Friedman, Jack P.; List of IBM Patents or Patent Applications Treated as Related; [date]; 1 page.

* cited by examiner

AUGMENTED REALITY Z-STACK PRIORITIZATION

TECHNICAL FIELD

The present disclosure relates generally to augmented reality systems, methods and tools.

BACKGROUND

Augmented reality (AR) is a live direct or indirect view of a physical real-world environment whose elements of the physical world are modified with computer generated sound, video or graphics when displayed through a computing system. AR is related to the concept of computer-mediated reality, in which a view of reality is modified by a computer. Augmented reality enhances one's current perception of reality, whereas in contrast, virtual reality replaces the real world with a simulated one. Augmentation techniques are typically performed in real time and in semantic context with environmental elements, such as overlaying supplemental information over a live video feed.

With the help of advanced AR technology (e.g. adding computer vision and object recognition) the information about the surrounding real world of the user becomes interactive and digitally manipulatable. Information about the environment and its objects are overlaid onto views and images of the real world. This information can be virtual or real. For example, seeing other real sensed or measured information such as electromagnetic radio waves overlaid in exact alignment with where they are in space.

SUMMARY

A first embodiment of the present disclosure provides a method for prioritizing a stacking order of a z-index of virtual overlays of an augmented reality system comprising the steps of: determining, by a processor, a primary focus of a user operating an augmented display system; detecting, by a processor, one or more objects viewed through the augmented display system; designating, by the processor, each of the one or more objects as a primary object and a secondary object as a function of the primary focus of the user; retrieving, by the processor, the virtual overlays from one or more data sources corresponding to each primary object and secondary object; assigning, by the processor, the stacking order for each of the virtual overlays in the z-index of a heads-up display (HUD) of the augmented display system generated by the processor, wherein a stacking order of the virtual overlays of the primary object is higher than a stacking order of the virtual overlays of each secondary object and; displaying, by the processor, each of the virtual overlays in the z-index of the HUD in accordance with the stacking order assigned, and juxtaposing each of the virtual overlays near each corresponding primary object or secondary object.

A second embodiment of the present disclosure provides a computer system, comprising: a processor; a memory device coupled to the processor; a visual recording system comprising a camera, coupled to the processor; a display device, coupled to the processor; and a computer readable storage device coupled to the processor, wherein the storage device contains program code executable by the processor via the memory device to implement a method for prioritizing a stacking order of a z-index of virtual overlays comprising the steps of: determining, by the processor, a primary focus of a user operating an augmented display system; detecting, by a processor, one or more objects viewed through the augmented display system; designating, by the processor, each of the one or more objects as a primary object and a secondary object as a function of the primary focus of the user; retrieving, by the processor, the virtual overlays from one or more data sources corresponding to each primary object and secondary object; assigning, by the processor, the stacking order for each of the virtual overlays in the z-index of a heads-up display (HUD) of the augmented display system generated by the processor, wherein a stacking order of the virtual overlays of the primary object is higher than a stacking order of the virtual overlays of each secondary object and; displaying, by the processor, each of the virtual overlays in the z-index of the HUD in accordance with the stacking order assigned, and juxtaposing each of the virtual overlays near each corresponding primary object or secondary object.

A third embodiment of the present disclosure provides a computer program product comprising: one or more computer readable hardware storage devices having computer readable program code stored therein, said program code containing instructions executable by the one or more central processing units (CPU) of a computer system implementing a method for comparing products using augmented reality comprising the steps of: determining, by the CPU, a primary focus of a user operating an augmented display system; detecting, by a CPU, one or more objects viewed through the augmented display system; designating, by the CPU, each of the one or more objects as a primary object and a secondary object as a function of the primary focus of the user; retrieving, by the CPU, the virtual overlays from one or more data sources corresponding to each primary object and secondary object; assigning, by the CPU, the stacking order for each of the virtual overlays in the z-index of a heads-up display (HUD) of the augmented display system generated by the CPU, wherein a stacking order of the virtual overlays of the primary object is higher than a stacking order of the virtual overlays of each secondary object and; displaying, by the CPU, each of the virtual overlays in the z-index of the HUD in accordance with the stacking order assigned, and juxtaposing each of the virtual overlays near each corresponding primary object or secondary object.

BRIEF DESCRIPTION OF THE DRAWINGS

FIG. 2b depicts a front view of the embodiment of the augmented display system of FIG. 2a.

FIG. 2c depicts a side view of the embodiment of the augmented display system of FIG. 2a.

FIG. 3b illustrates a rear view of the alternative embodiment of the augmented display system of FIG. 3a.

DETAILED DESCRIPTION

Figure 1:
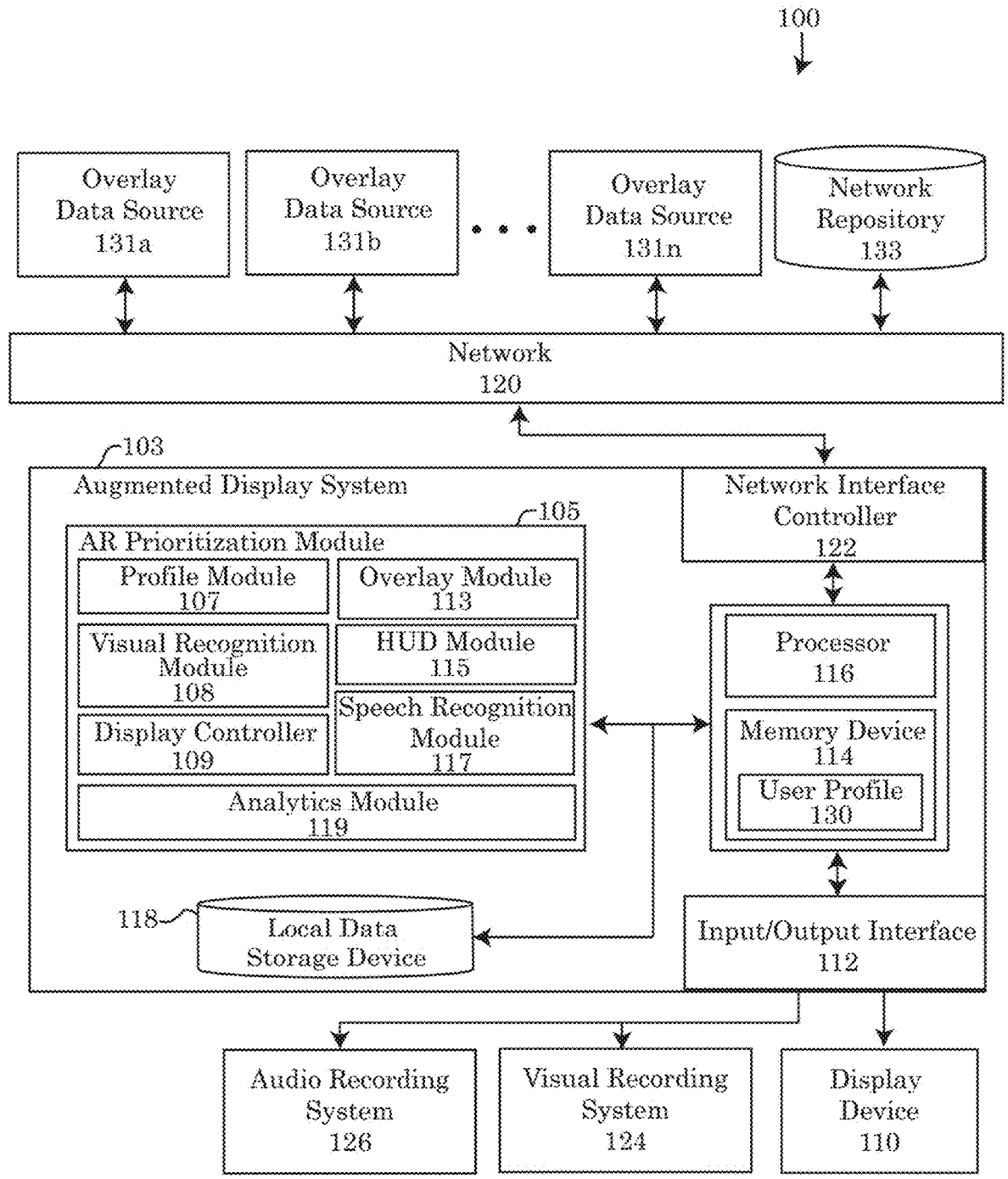
FIG. 1 depicts a block diagram of an embodiment of a system for prioritizing a stacking order of a z-index of virtual overlays of augmented reality.
Figure 2A:
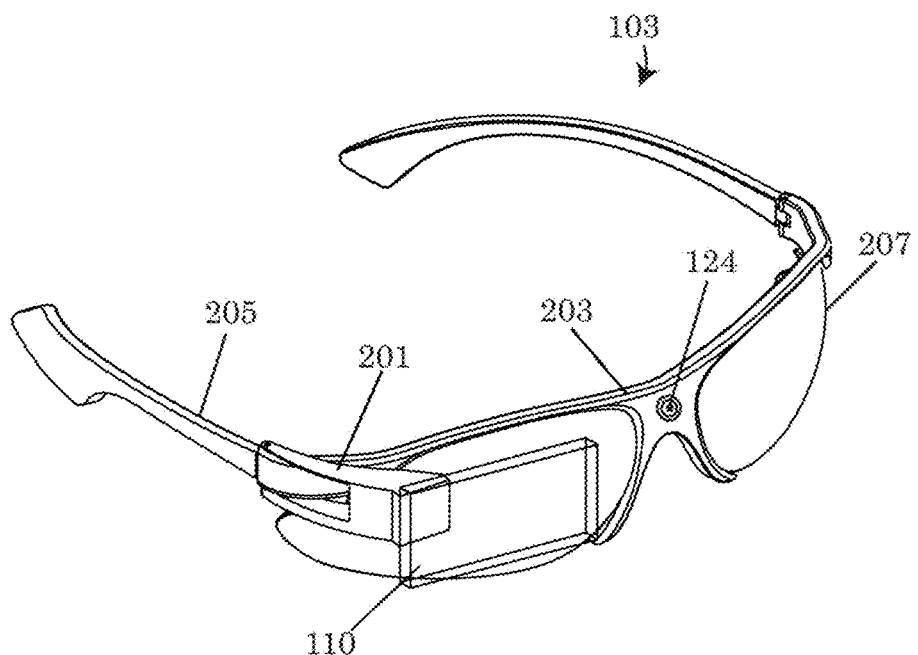
FIG. 2a depicts an isometric view of an embodiment of an augmented display system.
Figure 2B:
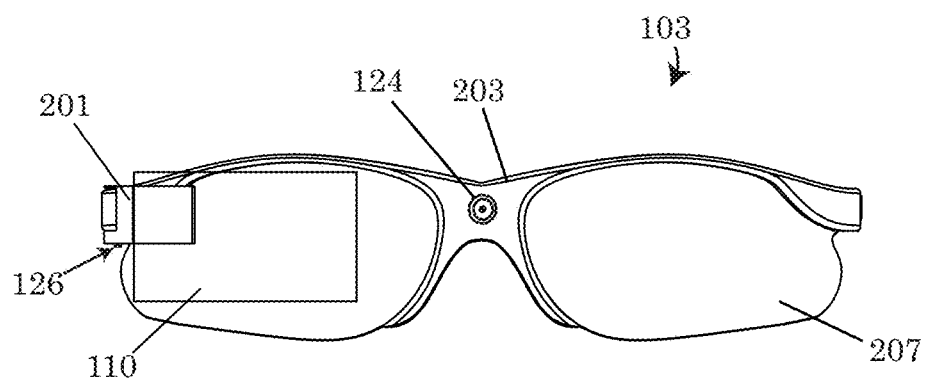
Figure 2C:
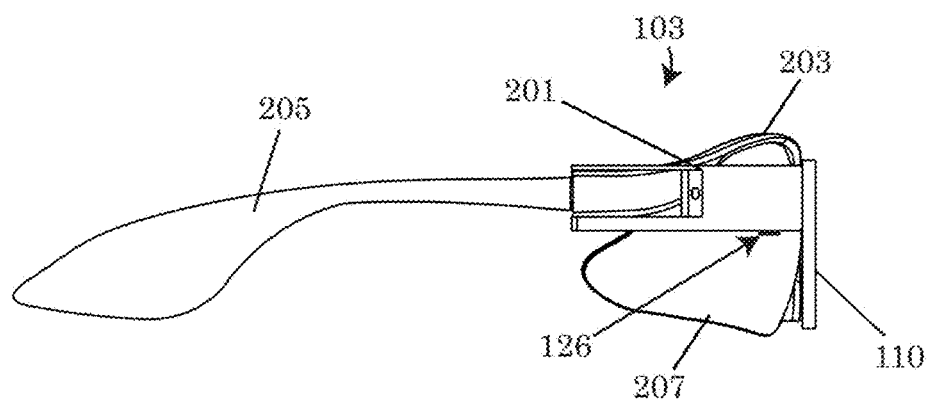
Figure 2D:
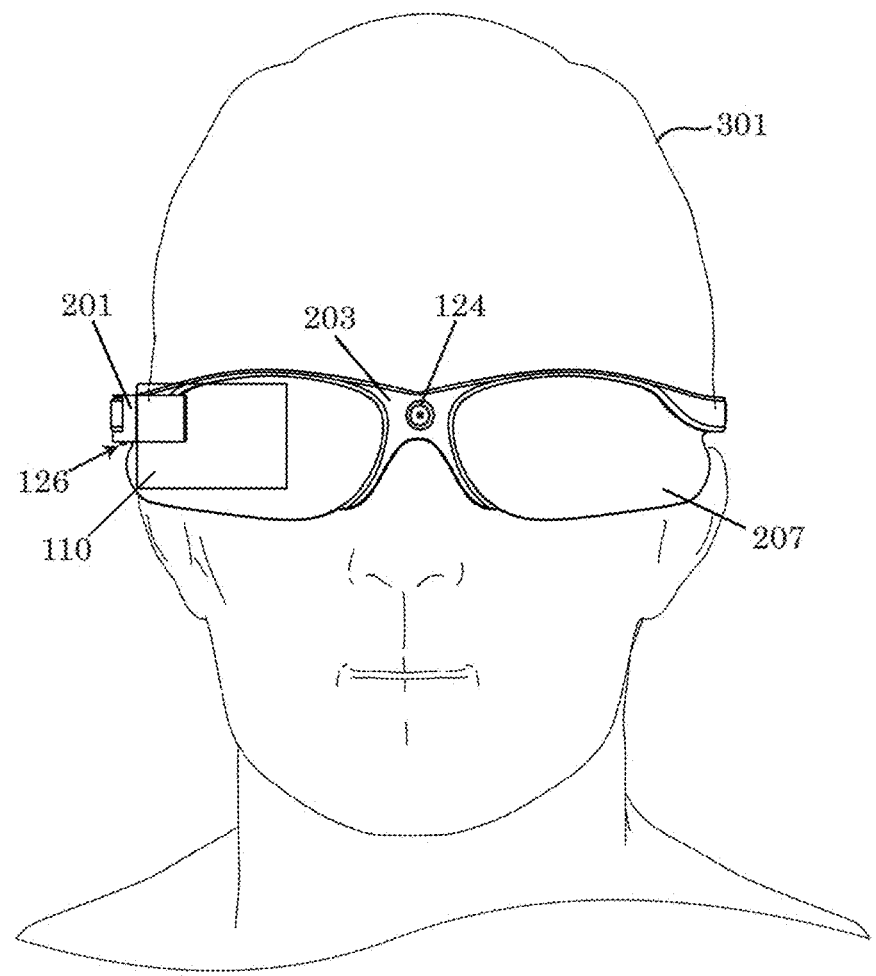
FIG. 2d illustrates an embodiment of an augmented display system equipped by a user 310.
Figure 3A:
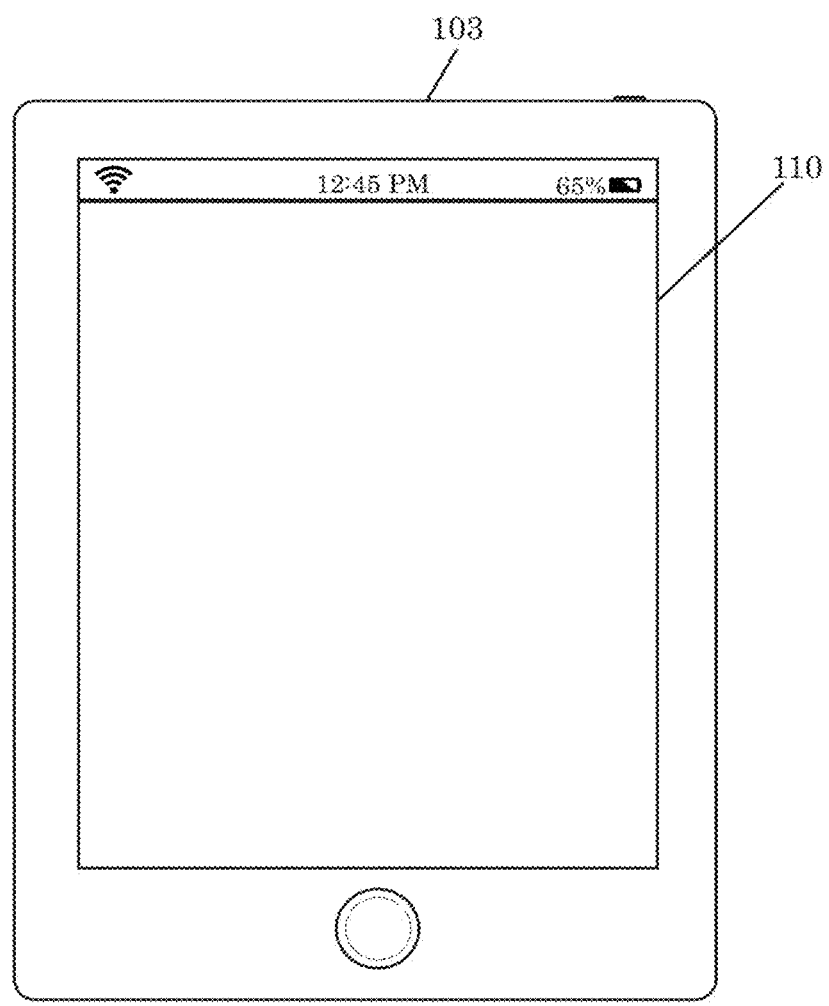
FIG. 3a illustrates a front view of an alternative embodiment of an augmented display system.
Figure 3B:
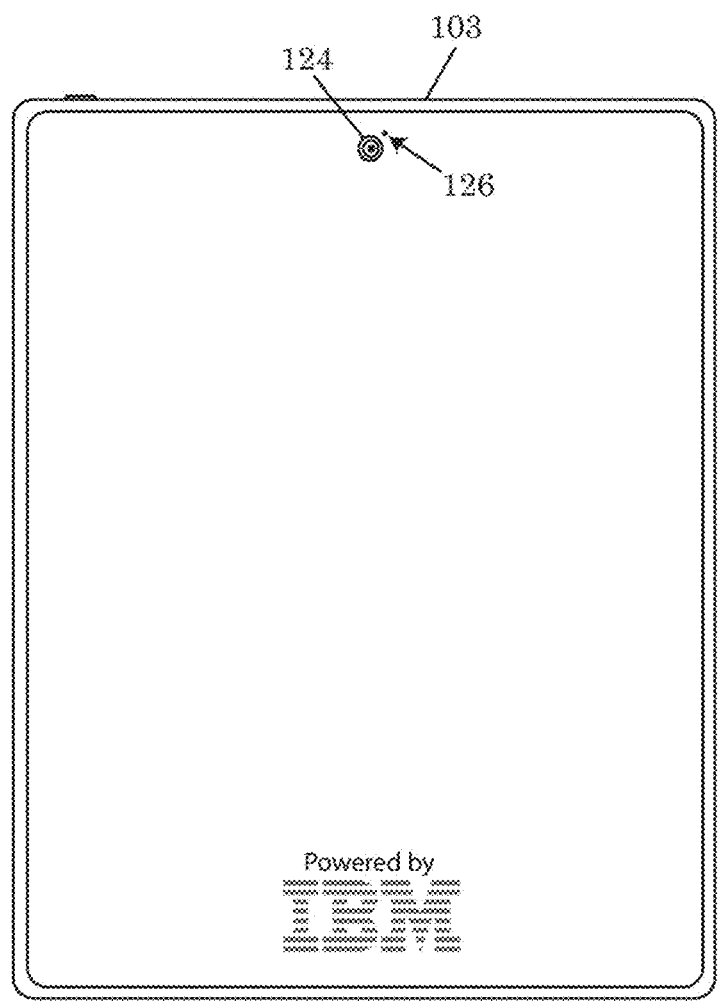

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Augmented reality (AR) is continuing to become increasingly popular as AR technologies improve and advance. AR systems such as Google glass, Samsung Gear and a—plethora of associated AR applications have become more prolific in view of the advancements in AR and computing technology generally. However, currently available AR hardware, software and platforms are still imperfect. One noticeable flaw in the currently available AR technology may be due to the insufficient ability of AR systems and software to dynamically prioritize the stacking order of z-indexes providing virtual overlays of information, graphics, images or other computerized objected applied to the augmented HUD. The lack of prioritization in the stacking order may cause augmented reality objects that overlay the augmented world to obstruct the view of important and valuable information that is being presented by the AR systems. Therefore, there is a need for prioritizing the stacking order of the virtual overlays providing virtual objects within the augmented reality environment based on the importance of the information found within the virtual overlay to the user. Thus, improving the current AR systems, hardware and software by preventing more important information overlaid or juxtaposed in the augmented reality system's display device from being obstructed due to an implementation of a chronological, archaic, or random prioritization methods.

Embodiments of the present disclosure understand the need for improving augmented reality. Embodiments of the present disclosure improve currently available augmented reality systems, methods and tools by prioritizing the stacking order of virtualized objects (referred to as virtual overlays) within a z-index in an order that presents the most valuable, relevant or important information more prominently and thus higher in the stacking order. A stacking order may refer to a relationship between one or more virtualized objects and the order in which certain layers of the virtualized objects may obscure the view of others within the same virtual space of augmented reality viewed through a HUD. For example, two virtual objects, such as windows of an operating system or graphical user interface (GUI) may have a set stacking order, wherein the currently targeted window is positioned on the top (highest priority) over other windows that may be currently open. In the current disclosure, the virtualized objects are one or more different objects that may contain graphics, images, video, text, etc., creating the virtual overlays that may be presented on a HUD of a display device 110 using an augmented display system 103.

The embodiments of the present disclosure may prioritize the stacking order of one or more virtual overlays dynamically, as a function of the user's 301 primary focus 401, while assigning secondary objects 406a, 406b, 406c (referred to generally as "secondary objects 406") or tertiary objects 405a, 405b, 405c, 405d, 405e (referred to generally as "tertiary objects 405") to a lower level of the z-index. As the user's 301 primary focus 401 changes from one primary object 403 to another, the stacking order of the z-index may also change. The primary focus 401 on the primary object 403 may have the highest priority in the stacking order of the z-index. The primary object 403 may be determined to be (at least initially) the most important object to the user 301 within the current viewing distance of the augmented display system 103. Embodiments of the present disclosure may use one or more techniques to identify the primary focus 401 of the user 301. For instance, the augmented reality systems 103 may estimate the user's 301 primary focus 401 based on the direction of the user's 301 gaze, the focal point of one or more visual recording systems 124 (i.e. cameras) integrated into an augmented display system 103, or the user may manually highlight one or more objects via the HUD or interface of the augmented display system 103.

The next layer below the primary objects 403 that are prioritized within the stacking order of the z-index may comprises secondary objects 406 and the secondary overlays 409 corresponding to each secondary object 406. Secondary objects 406 may be one or more objects within the viewing distance or range of an augmented display system 103 which may be tagged or identified as being related to a primary object 403 in some manner. For example, the secondary object 406 may be a similar type of product offered by a competitor, another product offering under the same brand as the primary object 403 or an object tagged with similar keywords or metadata as a primary object 403. In some instances, multiple secondary objects 406 may be present. Embodiments of the present disclosure may prioritize the stacking order of multiple secondary objects 406 and each corresponding secondary overlays 409 based one or more secondary factors. Embodiments of the secondary factors may include (but are not limited to) a value of a particular promotion (i.e. best promotional deal may be prioritized), relevance to the user's 301 browsing history and preferences, social relationships and recommendations, purchase history, the user's surrounding environment, and the cognitive state of the user 301.

The next layer below the secondary objects in the stacking order may be tertiary objects 405 and each tertiary overlay 411a, 411b (referred generally as tertiary overlay 411) corresponding to each tertiary object 405. Embodiments of tertiary objects 405 may include one or more objects detected within the viewing distance of a user operating an augmented display system 103. However, unlike the secondary objects 406 which may bear some related ancillary or related characteristic to the primary object 403 of the user's 301 primary focus 401, a tertiary object may not. For instance, when shopping at a store, a store shelf in the electronics department may have numerous different types of gadgets and electrical devices within the viewing distance of the augmented display system 103. While the user may find some of the items interesting and useful, the tertiary objects 405 may not currently be closely related enough to the primary object 403 to warrant a higher priority in the z-index. Therefore, while tertiary objects 405 and each corresponding tertiary overlay 411 may be displayed within the HUD of the display device 110 of the augmented display system 103, tertiary objects 405 may have the lowest priority and be obscured from view by primary objects 403, primary overlays 407, secondary objects 406 and secondary overlays 409.

However, similar to the secondary objects 406, a plurality of tertiary objects 405 may exist within the z-index. In some embodiments, the augmented display system 103 may further prioritize one or more tertiary objects 405 and each corresponding tertiary overlay 411, relative to the remaining tertiary objects 405 and corresponding tertiary overlays 411. Prioritization among the co-equal tertiary objects 405 may occur in a manner similar to the prioritization amongst the secondary objects 406 described above. For example, each tertiary object 405 and the substance of the corresponding tertiary overlays 411 may be compared for secondary factors that may be identified as making one tertiary object 405 more important to the user 301 than another tertiary object 405. These secondary factors to consider by the augmented display system 103 may include the value of a promotion tied to an object (i.e. best or most value provided by a promotional deal may be prioritized and thus be presented higher in a stacking order), the relevance of the tertiary object 405 to the user's 301 browsing history or preferences, mentions of the tertiary object by individuals with a social relationship to the user 301 (i.e. via social media), recommendations by others, purchase history of the user 301, the user's 301 surrounding environment, and the cognitive state of the user 301.

Using the primary focus 401 of the user 301 as a starting point, an augmented display system 103 may detect one or more objects or depictions of objects (such as signs, billboards, images, etc.) within the viewing distance user's primary focus 401. The augmented display system 103 may categorize each object as a primary object, 403, secondary object 406 or tertiary object 405. Embodiments of the augmented display system 103 may retrieve or load one or more virtual overlays into a memory device 114 of the augmented display system 114 and generate a GUI of a HUD comprising each of the virtual overlays. Embodiments of the augmented display system 103 may assign a stacking order within the z-index for each object detected along with the corresponding virtual overlay that is juxtaposed onto the GUI of the HUD. The augmented display system 103 may prioritize the primary object 403 having a primary overlay 407 as the highest layer of the stacking order. Subsequently, the next highest layer may include the secondary objects 406 and each corresponding secondary overlays 409, wherein any overlap between the primary overlay 407 and the secondary overlay 409 may result in the primary overlay 407 obscuring all or a portion of the secondary overlay 407 due to the prioritization of the primary overlay in the stacking order of the z-index. Lastly, each tertiary object 405 and corresponding tertiary overlay 411 may also be juxtaposed onto the GUI of the HUD. Any portions of the tertiary overlay overlapping within the same virtual space as either a primary overlay 407 or a secondary overlay 409 may be partially or entirely obscured from the user's view, allowing for the more predominate primary overlay 407 or secondary overlay to receiving priority viewing by the user 301.

System for Prioritizing Stacking Order of a Z-Index

Referring to the drawings, FIG. 1 illustrates a diagram of an embodiment of a system 100 for prioritizing a stacking order of a z-index of virtual overlays using augmented reality, consistent with the disclosures of this application. Embodiments of system 100 may comprise specialized computer systems referred to as augmented display systems 103, which may each have a specialized configuration of hardware, software or a combination thereof as depicted in FIGS. 1-7 and as described throughout the present disclosure. Embodiments of the augmented display systems 103 may each comprise one or more elements of a generic computer system 900 of FIG. 9 (described in detail below). One or more of the elements of the generic computer system 900 may be integrated into each of the augmented display systems 103 described herein or other computer systems of system 100, for example network repository 133 or a computer system maintaining an overlay data source 131a, 131 . . . 131n (referred to generally as overlay data source 131) such as a server or other network accessible computer system.

Embodiments of the augmented display systems 103 may be a specialized computer system which may include one or more processors 116, specialized hardware or circuitry and/or software loaded in the memory device 114. The embodiments of the augmented display system 103 may perform functions, tasks and routines relating to the detection and viewing of each object or representations of objects, querying overlay data sources 131 to retrieved one or more virtual overlays relating to the objects being viewed by the augmented display system 103, retrieving said virtual overlays from the overlay data sources 131 or network repository 133, assigning categories to each object being viewed, generating a GUI of a HUD comprising the virtual overlays juxtaposing each object corresponding object, prioritizing the stack order of each virtual overlay in the z-stack of HUD's GUI and displaying the augmented reality within the HUD comprising the physical, virtual or representations of the viewed objects and each virtual overlay as a function of the z-index's stacking order.

Embodiments of the augmented display systems 103 may be connected and placed in communication with one or more additional computer systems or hardware, over a computer network 120. Embodiments of the network 120 may be constructed using wired or wireless connections between each hardware component or virtualized hardware connected to the network 120. As shown in the exemplary embodiment of FIG. 1, each of the augmented display systems 103 may connect to the network 120 and communicate over the network 120 with additional computer systems such as overlay data sources 131 and network repositories 133 using a network interface controller (NIC) 122 or another network communication device.

Embodiments of the NIC 122 may implement specialized electronic circuitry allowing for communication between each member of the network 120 using a specific physical layer and a data link layer standard, such as Ethernet, Fiber channel, Wi-Fi or Token Ring. The NIC 122 may further allow for a full network protocol stack, enabling communication over network 120 to the augmented display systems 103, overlay data sources 131 (such as servers hosting virtual overlays and other graphical objects), network repositories 133 and other computing hardware devices linked together through communication channels. The network 120 may facilitate communication and resource sharing among the augmented display system 103, overlay data sources 131 and additional hardware devices connected to the network 120, for example a network repository 133 or other network accessible storage devices connected to the network 120. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments, the network 120 may be a cloud computing environment 50. Cloud computing is a model of service delivery enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics of the cloud computing model may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms.

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models under a cloud computing environment 50 may be described as follows:

Software as a Service (SaaS): the capability provided to the consumer is to use the provider's applications running on a cloud infrastructure. The applications are accessible from augmented display devices 103 through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 6:
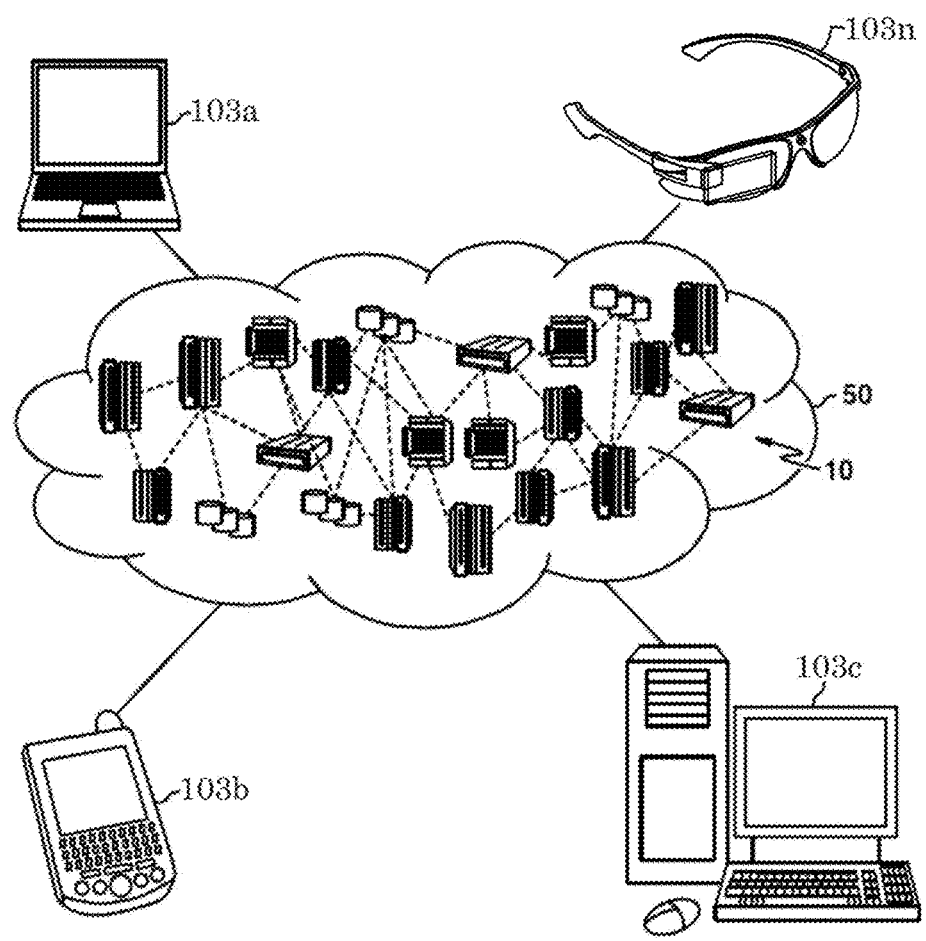
FIG. 6 illustrates a schematic view of an embodiment of a system for prioritizing a stacking order of a z-index of virtual overlays of augmented reality operating in a cloud computing environment.

A cloud computing environment 50 may be service oriented with a focus on statelessness, low coupling, modularity, and semantic interoperability. At the heart of cloud computing is an infrastructure that includes a network of interconnected nodes 10. Referring to the drawings, FIG. 6 is illustrative of a network 120 operating as a cloud computing environment 50. As shown, the cloud computing environment 50 may include one or more cloud computing nodes 10 with which client computing devices, such as one or more augmented display systems 103a, 103b, 103c . . . 103n (referred to collectively as "augmented display systems 103") used by cloud consumers, such as, for example, desktop computers 103c, laptop computers 103a, and mobile communication devices 103b, tablet computers or computer systems integrated into devices as exemplified by the smart glasses 103*n* shown in FIG. 6.

Computer system nodes 10 of the cloud computing environment 50 may communicate with one another and may be grouped physically or virtually (not shown), in one or more networks, such as Private, Community, Public, or Hybrid clouds as described hereinabove, or a combination thereof, allowing for the cloud computing environment 50 to offer infrastructure, platforms and/or software as services for which a cloud consumer does not need to maintain resources on an augmented display device 103. It is understood that the types of augmented display devices 103 as shown in FIGS. 1-5 are intended to be illustrative only and that nodes 10 of a cloud computing environment 50 can communicate with any type of augmented display devices 103 over any type of network 120 and/or network addressable connection (e.g., using a web browser).

Figure 7:
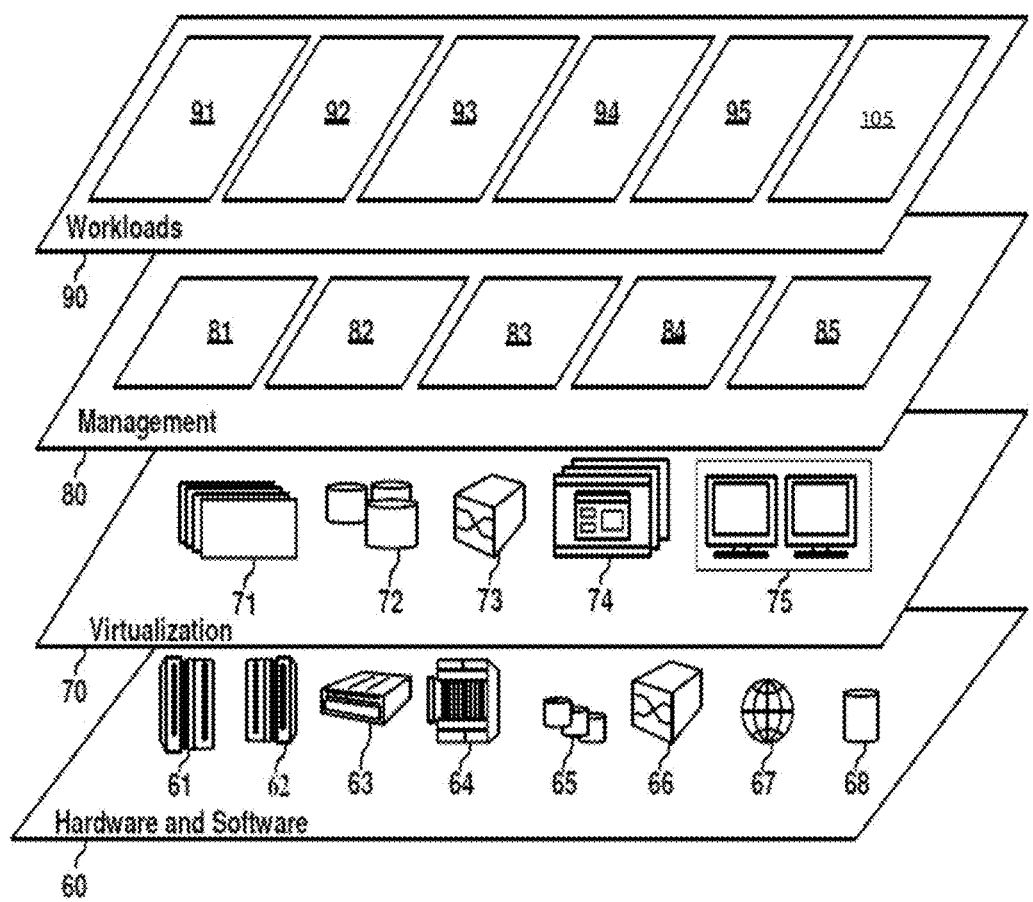
FIG. 7 illustrates a schematic view of an embodiment of the abstraction layers of a cloud computing environment.

Referring now to FIG. 7, a set of functional abstraction layers provided by a cloud computing environment 50 of the network 120 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Embodiments of the management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment of the network 120 for consumers (i.e. users 301) and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: records management 91; web page management 92; searching and results management 93; data analytics processing 94; profile management 95; and AR prioritization module 105.

Embodiments of the system 100, and augmented reality functions prioritizing the stacking order of one or more virtual overlays viewed using system 100, may be managed and controlled by an augmented display system 103. The augmented display system 103 may be responsible for detecting the presence of each object viewed within the viewing range of the augmented display system 103, detecting the primary focus 401 of the user 301, identifying any secondary objects 406 or tertiary objects 405 within range of the primary objects 403 that are the subject of the user's primary focus 401, querying and retrieving virtual overlays 407, 409, 411 corresponding to each primary object 403, secondary object 406 and each tertiary object 405. The augmented display system 103 may generate and display a HUD that may be viewable by the user, wherein the HUD may comprise a mixture of graphics, images, video and text of the virtual overlays 407, 409, 411 juxtaposed onto the one or more objects 403, 405, 406 or representations thereof (real or virtual). During the generation and display of the HUD, the augmented display system 103 may be responsible for creating or adjusting the stacking order of each virtual overlays 407, 409, 411 wherein the primary overlays 407 have the highest priority, the secondary overlays 409 have the next priority, followed by the tertiary overlays 411 which may have the lowest priority.

Embodiments of the augmented display system 103 may include specialized hardware and/or software integrated into the augmented display system 103 performing each of the functions of the augmented display system 103 mentioned above and throughout this application. The specialized components of the augmented display system 103, implementing each function or task may be part of an AR prioritization module 105. The hardware and/or software components of the AR prioritization module 105 may include one or more sub modules in some embodiments. These sub modules may include a profile module 107, visual recognition module 108, display controller 109, overlay module 113, HUD module 115, speech recognition module 117 and analytics module 119. As used herein, the term "module" may refer to a hardware module, software-based module or a module may be a combination of hardware and software resources of a computer system and/or resources remotely accessible to the augmented display system 103 via the computer network 120.

Embodiments of the modules or sub modules described in this application, whether comprising hardware, software or a combination of resources thereof, may be designed to implement or execute one or more particular functions, tasks or routines of the augmented display system 103 described herein. Embodiments of hardware-based modules may include self-contained components such as chipsets, specialized circuitry and one or more memory devices comprising a memory storage medium (described below). A software-based module may be part of a program code or linked to program code or computer code 997, 998 containing specific programmed instructions loaded into a memory device 114 of the augmented display system 103, and/or a remotely accessible memory device 114 of another network accessible computer system accessed remotely by the augmented display system 103 over the network 120. For example, in some embodiments the network accessible computer system connected to the augmented display system 103 may be a web server, application server, remote client device or other network accessible hardware.

Embodiments of the augmented display system 103 may include an AR prioritization module 105 which may be responsible for implementing one or more functions or tasks of the augmented display system 103. Some embodiments of the AR prioritization module 105 of the augmented display system 103 may include a profile module 107. The profile module 107 may be responsible for performing the tasks and functions of managing each individual user profile corresponding to the current user 301 operating the augmented display device 103. A user 310 of the augmented display system may identify a particular user profile corresponding the user 301's viewing habits, searches, purchase history, history of viewed products as well as social media interactions, email or messaging discussions. The profile module 107 may load the user profile 130 corresponding to the current user 301 of the augmented display device 103 into the memory device 114 of the augmented display system 103. Upon loading the appropriate user profile 130, custom configurations, settings, product search histories and past user experiences, including a log file describing the types of objects previously focused on by the user, may be accessible. The use of separate and distinct user profiles 130 may allow for multiple users 301 of a single augmented display system 103 to separately store and recall their own distinct user information and product viewing histories, thus providing a customized experience, more accurate or relevant object prioritization unique to each user's own habits of use.

In some embodiments, the profile module 107 may retrieve user profiles stored remotely on the network 120, for example in a network repository 133. By storing user profiles 130 remotely, a user 301 may not be tied to a specific augmented display system 103. Rather, even if a user 301 changes the augmented display device the user 301 is using, the profile module 107 may retrieve and update the same user profile 130 across all augmented display systems 103 used by a specific user 301. Thus, allowing for a user 301 to load customized settings and build a continuous and seamless viewing and purchase history even when periodically using different augmented display systems 103.

Embodiments of the AR prioritization module 105 may comprise a visual recognition module 108. The visual recognition module 108 may be responsible for controlling the visual recording system 124, establishing a primary focus 401 of the user 301, detecting each type of object 403, 405, 406 viewed using the visual recording system 124. The visual recording system 124 may include camera systems, video processing hardware/software and video recording hardware/software. Embodiments of the visual recording system 124 may record or stream visual images and video data from an input device of the visual recording system 124 (such as a camera) to the visual recognition module 108. The visual recognition module 108 may process the recorded or streamed visual images and/or video data to identify the primary focus 401 of the user, a primary object 403 that may be associated with the user's primary focus 401, secondary objects 406 that may be categorically, functionally or commercially related to the primary object 403, such as being the same brand, a competing product, identified with similar keywords, similarly tagged or comprising identifiers that may be similar to the primary object 403 and within the frame of the visual images or video data being recorded or streamed. The visual recognition module 108 may also identify and any tertiary objects 405 that may be unrelated to the primary object 403, but may still be within the frames of the visual images or video data captured by the visual recording system 124.

Embodiments of the visual recognition module 108 may identify the primary focus 401 of a user 301 and each type of object 403, 407, 409 within the viewing range of the augmented display system 103 using one or more techniques for detecting the focus of a user 301. For example, the visual recognition module 108 may calculate the positioning of the user's eye gaze, use image recognition to identify the closest objects to the user 310, location based solutions which may identify the product of interest based on the known location of the user 301 or by allowing the user 301 of the augmented display system 103 to manually select an option which indicates a user's 301 primary focus 401 on a specific primary object 403 being viewed through the camera of the visual recording system 124.

In some embodiments, the visual recognition module 108 may include object recognition software that may implement algorithms and mechanisms that allow for the augmented display system 103 to identify each of the objects 403, 407, 409 being viewed by the visual recording system 124. The object recognition element of the visual recognition module 108 may utilize matching, learning, or pattern recognition algorithms using appearance-based or feature-based techniques to identify not only the primary object 403 being focused on by the user of the visual recording system 124, but also surrounding objects that may be related to the primary object 403 (i.e. secondary objects 406) as well as one or more un-related tertiary objects that may be littered around the primary object 403. Common techniques implementing object recognition may include deep learning based approaches such as convolutional neural networks (CNN), feature-based approaches using edges, gradients, histogram of oriented gradients (HOG), Haar wavelets, and linear binary patterns. Some object recognition techniques may implement a variety of learning models including feature extraction, machine learning models, deep learning models, Bag-of-words models such as SURF and MSER, derivative based matching approaches, the Viola-Jones algorithm, template matching, image segmentation and/or blob analysis.

Embodiments of the visual recognition module 108 may draw conclusions directed toward which objects 403, 405, 406 are the focus of the user 301 of the augmented display system 103 as well as the identification of the objects in order to further obtain additional information and visual data to overlay or juxtapose onto a HUD of the augmented display system's 103 display device 110. Embodiments of the visual recognition module 108 may integrate analytics engine or separate analytics module 119 to analyze and draw conclusions about the primary focus 401 of the user 301, the identification of one or more objects 403, 405, 406 and whether or not each of the objects 403, 405, 406 are somehow related to the primary object 403 that is the primary focus 401 of the user 301. Embodiments of the visual recognition module 108, may, based on the identification of each object 403, 405, 406, categorize or tag the identified objects 401 with keywords, meta tags or identifying indicators which may be used later on in order to classify the objects as being a secondary object 406 that may be related to a primary object that has been previously identified and/or tagged with the same or related key words, tags or indicators. Based on the identification of the objects 403, 405, 406 within the viewing distance of augmented display system 103, the visual recognition module 108 may call the overlay module 113 (discussed below) to retrieve additional information about the identified objects for display to the user 301 via the HUD of the display device 110.

In some embodiments of the augmented display system 103, the AR prioritization module 105 may comprise a display controller 109. A display controller 109 may be an electrical circuit that may perform the task or function of actuating the display device 110 and deliver the stream of images or video data recorded by the visual recording system 124 to the display device 110. Upon initiating the visual recording system 124, the image and video data may be transmitted from the visual recording system's camera(s) to the visual recognition module 108 and/or the display controller 109. The display controller 109 may deliver the frames content of the images and video being recorded by the visual recording system 124 to the display device 110, allowing for the user 301 of the augmented display system 103 to view the images and/or video data as the data is being inputted into the camera system of the visual recording system 124. Thus, allowing for a real-time viewing of the image and video data of each object 403, 405, 406 being viewed in real life or as visual representations 501 on the display device 110 of the augmented display system 103.

Embodiments of the AR prioritization module 105 may, in some embodiments may comprise an overlay module 113. The overlay module 113 may perform the task or function of retrieving information, graphics, text or other data (described as a virtual overlay 407, 409, 411) corresponding to each object 403, 405, 406 identified by the visual recognition module 108. The graphics, text and information that comprise each virtual overlay 407, 409, 411 may be generated and juxtaposed onto the HUD of the display device's 110 GUI using the virtual overlay data retrieved from or more locations. Locations that may store virtual overlay data may include one or more overlay data sources 131, a local data storage devices 118 and/or network repositories 133. Embodiments of the overlay module 113 may query the system 100 for data that comprises the virtual overlays 407, 409, 411. Examples of overlay data sources 131 that may be queried by the overlay module 113 in order to retrieve the virtual overlay 407, 409, 411 data may include, but are not limited to searching a manufacturers website, accessible product servers, online retail stores, local and network accessible database records, third party websites, search engines, internet forums, and social media. Upon a successful query, the overlay module 113 may download the virtual overlays 407, 409, 411 to the augmented display system 103 or network accessible storage device such as network repository 133. The virtual overlay 407, 409, 411 may be transmitted to the HUD module 115 (described below) for augmented display onto the display device 110 overlaying or juxtaposing the virtual overlays 407, 409, 411 in the relative vicinity of the collected set of images and video data being displayed from the visual recording system 124.

The virtual overlays 407, 409, 411 data retrieved by the overlay module 113 may also be cataloged, registered and stored in a database or other data structure for quick retrieval of the virtual overlays 407, 409, 411 at a later point in time, if needed. The entry of each virtual overlay 407, 409, 411 may be tagged with keywords, Meta tags, identifiers and a brief description of the corresponding object, allowing for quick searches and retrievals of a specific virtual overlay, if an object becomes a primary object 403, secondary object 406 or tertiary object 405 at a subsequent point in time.

The overlay module 113 may in some instances receive a system call from the visual recognition module 108 requesting the overlay module 113 to search a database of virtual overlays 407, 409, 411 for one or more virtual overlays 407, 409, 411 associated with objects 403, 405, 406 currently within the viewing distance of the augmented display system 103. The overlay module 113 may query the database of stored virtual overlays 407, 409, 411 by descriptor, keyword, category and meta tags, and transmit the virtual overlays 407, 409, 411 to the HUD module 115 for augmented display 103 for prioritization of the stacking order and display on a HUD of a display device 110.

Embodiments of the augmented display system 103 may further comprise a heads-up display module 115 (abbreviated as "HUD Module 115"). The HUD module 115 may perform the task or function of generating a GUI of a HUD overlaying and/or juxtaposing one or more virtual overlays 407, 409, 411 onto the display device 110 within the vicinity of the images and/or video data provided by the visual recording system 124. The HUD module 115 may also prioritize the stacking order of each GUI element within the HUD including each virtual overlay 407, 409, 411 and data provided by the visual recording system 124. An example of the HUD module 115 overlaying or juxtaposing virtual overlays 407, 409, 411 onto a HUD of the augmented display system's 103 GUI can be seen in FIGS. 4a-5. Each of the virtual overlays 407, 409, 411 may be juxtaposed in a position corresponding to one or more images and video data of objects 403, 405, 406 (either real or depictions of object such as in print media or artistic renderings) or digital representations 503, 505, 506 of objects.

Figure 4A:
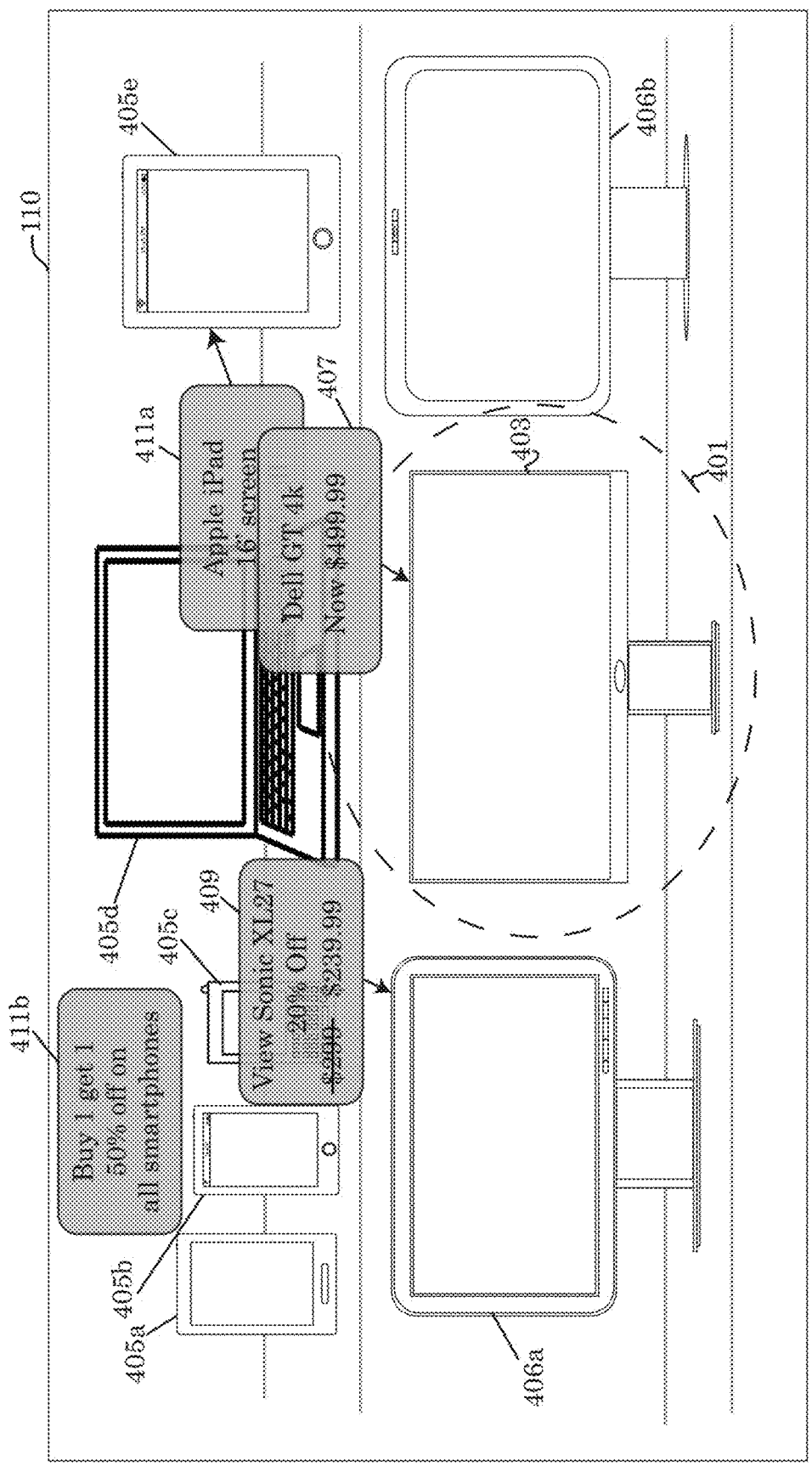
FIG. 4a depicts a first person view of a user viewing an embodiment of a HUD of an augmented display system overlaying an embodiment of a plurality of virtual overlays having a prioritized z-index as a function of the user's primary focus.

Referring to the drawings, FIG. 4a depicts an example of an embodiment of a HUD being overlaid or juxtaposed near one or more objects 403, 405, 406 within a display device 110 by generating a GUI capable of dynamically displaying one or more virtual overlays 407, 409, 411 corresponding to one or more primary 403, secondary 406 or tertiary 405 objects in a prioritized stacking order as a function of a the user's 301 primary focus 401 on a primary object 403. As shown in FIG. 4a, a user 301 may focus on a primary object 403 which is currently within the viewing range of the augmented display system 103. The primary focus 401 of the user 301 operating the augmented display system 103 is depicted by the dashed line surrounding the primary object 403. An object which may have been identified by the visual recognition module 108. The HUD module 115 may position a primary overlay 407 containing information about the primary object 403 (in this case a computer monitor) at the highest level of the stacking order within the z-index. In this example, the user 301 may be shopping for a new monitor and the system 100 may be prioritizing the virtual overlays 407, 409 of each available monitor in the stacking order so that each monitor is unobstructed by other nearby products that may be unrelated but might still be of some ancillary interest to the user 301.

The prioritized levels of stacking order can be seen by the fact that the primary overlay 407 partially obscures the tertiary overlay 411a corresponding to the tertiary object 405e which is lower in the stacking order due to not being the primary focus 401. Moreover, the example also demonstrates that a HUD module 115 may also place one or more secondary overlays 409 within the HUD appearing on the display device 110, which may contain information or data associated with the secondary object 406a as shown. The secondary object 406a may be considered higher in the stacking order and thus partially obscure the view of other nearby tertiary objects 405b, 405c or tertiary overlays 411 in favor of prioritizing the display of the secondary overlay 409 within the HUD. In this example, object 406a may be considered a secondary object 406a and thus receive higher prioritization because secondary object 406a is another monitor and thus categorically related in object type to the primary object 403 which is also a monitor, whereas tertiary objects 405a, 405b and 405c are mobile computing systems.

Figure 4B:
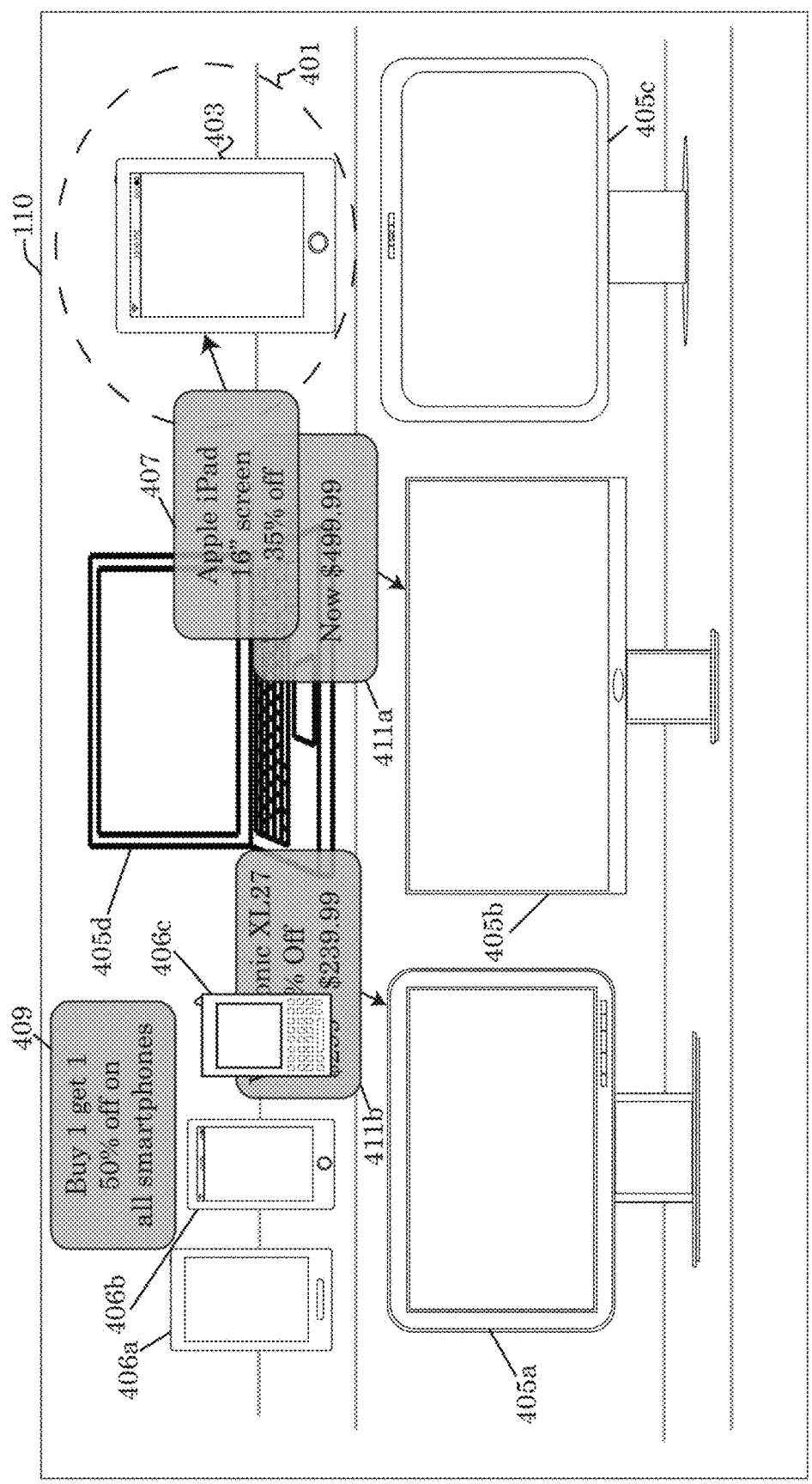
FIG. 4b depicts a first person view of a user viewing an embodiment of a HUD of an augmented display system overlaying an embodiment of a plurality of virtual overlays having an alternative prioritized z-index as a function of the user's primary focus.

The HUD module's prioritization of one or more virtual overlays 407, 409, 411 may dynamically change as the user 301 changes the primary focus 401 to different objects within the viewing distance of the augmented display system 103. FIG. 4b demonstrates an example of one or more changes that may occur within the stacking order of the z-index as a result of the change in primary focus 401 from a first object (a monitor) to a second object, a tablet computer (i.e. an Apple® iPad) in this second example. As seen by the difference between the shift in primary focus 401 of the user 301 from the monitor in FIG. 4a to the iPad in FIG. 4b, the iPad, when the iPad become the primary focus 401 the HUD module may dynamically reprioritize the stacking order of each virtual overlay 407, 409, 411 and reassign objects to a different priority. In the case of FIGS. 4a to 4b, the iPad changes from being a tertiary object 405e in FIG. 4a to a primary object 403 in FIG. 4b and thus has the highest priority in the stacking order. The change in priority can be seen by the difference between the virtual overlays corresponding to the objects. As the iPad becomes the primary focus 401, the corresponding virtual overlay becomes a primary overlay 407 and now obscures the view of tertiary overlay 411a associated with the monitor which has become a tertiary object 405b in FIG. 4b Moreover, in FIG. 4b, the previously obscured mobile computing systems in FIG. 4b may be classified as secondary objects 406 in the revised prioritization of FIG. 4b. The mobile computing systems may be considered categorically or similarly enough related to the tablet computer of the iPad to be assigned a higher priority in the stacking order over one or more of the monitors which have been subsequently assigned as tertiary objects in FIG. 4b. As a consequence of the change in stacking order, the monitor overlay previously associated with the View Sonic monitor in FIG. 4a become obscured and less visible within FIG. 4b as it has been deemed by the HUD module 115 to be less important or relevant as the mobile computing devices.

Figure 4C:
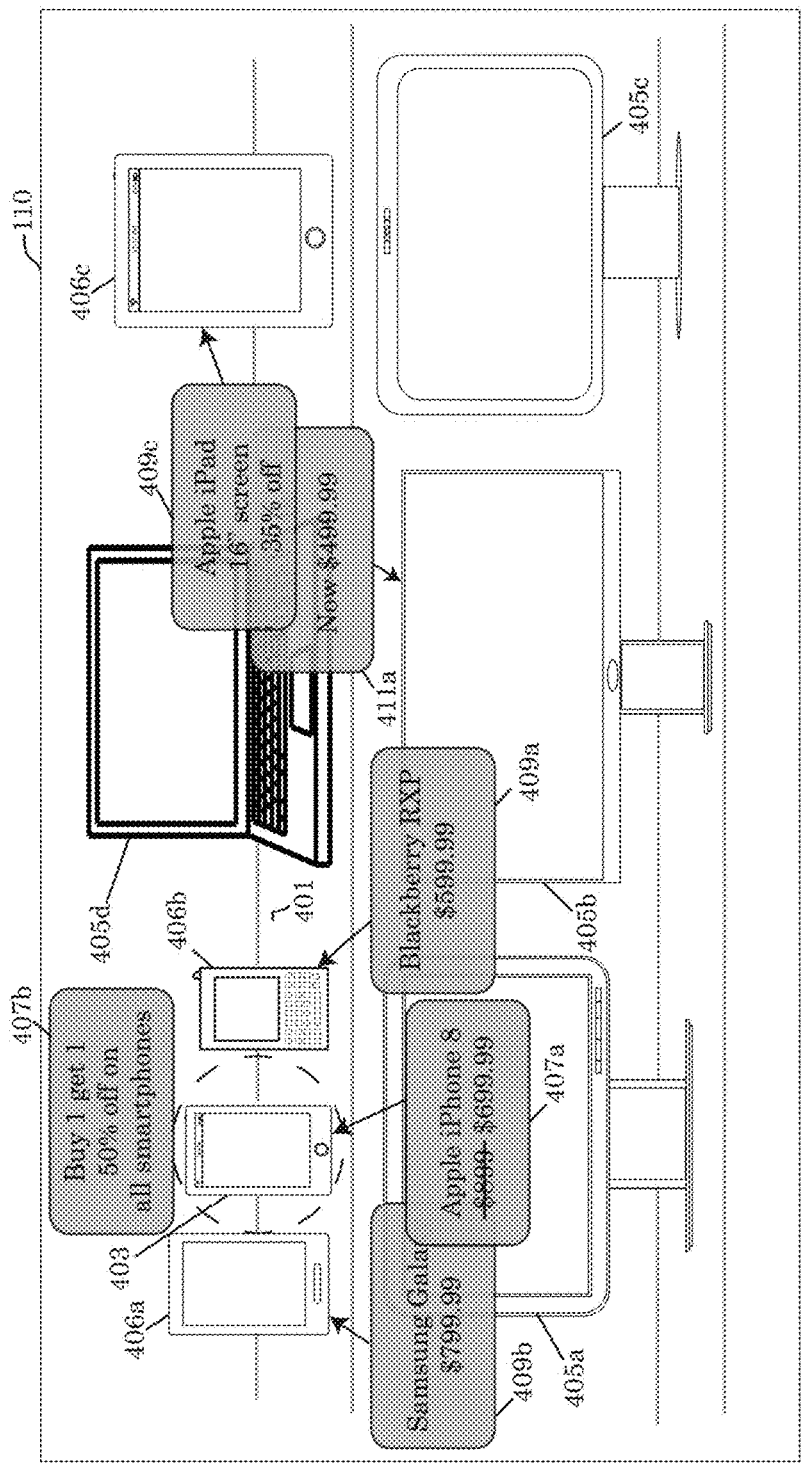
FIG. 4c depicts a first person view of a user viewing an embodiment of a HUD of an augmented display system overlaying an alternative embodiment of a plurality of virtual overlays have another alternative prioritized z-index as a function of the user's primary focus.
Figure 5:
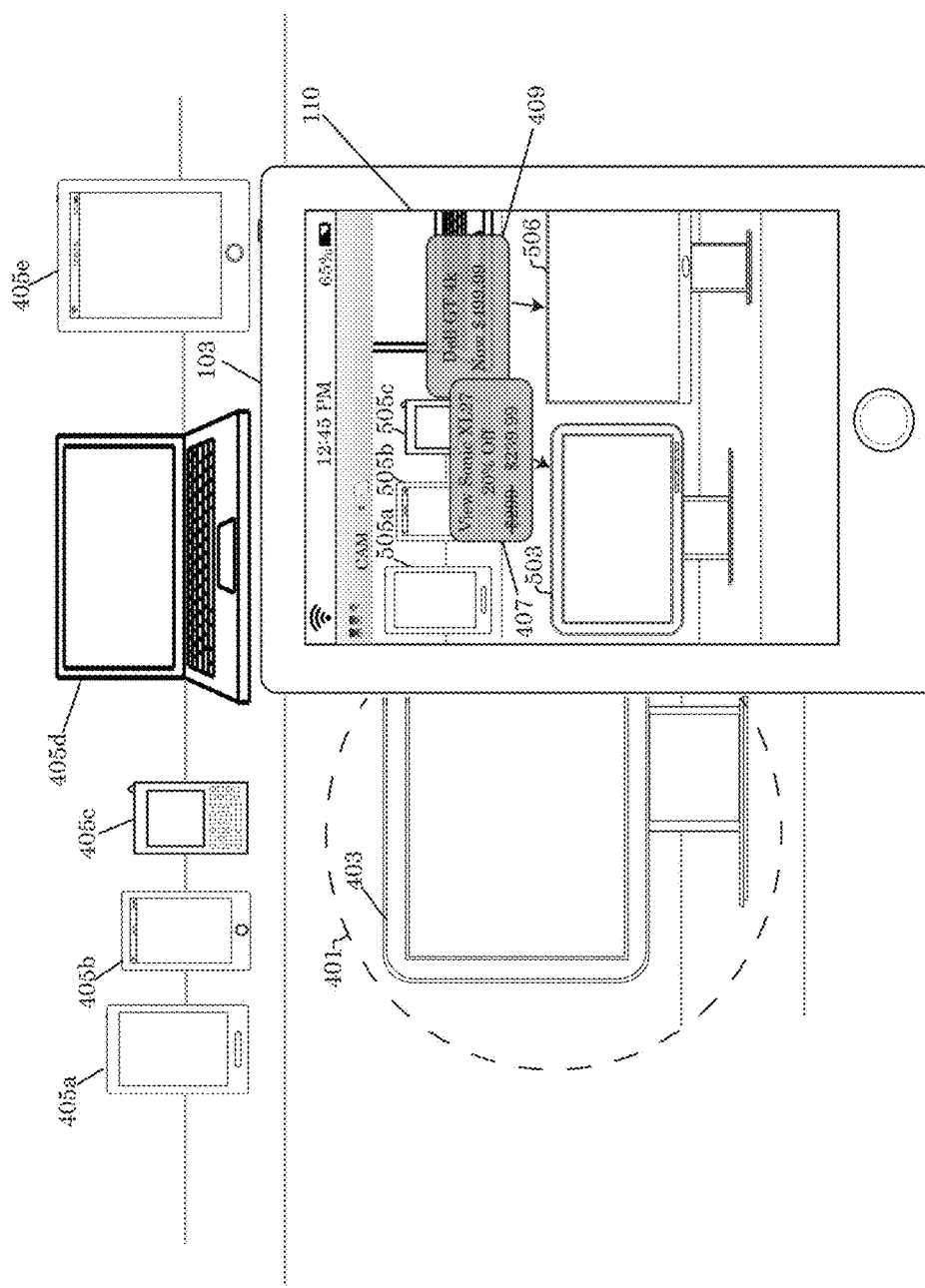
FIG. 5 depicts a first person view of a user viewing a display device of an alternative embodiment of an augmented display system overlaying a plurality of virtual overlays having a prioritized z-index onto a virtualized display of objects.

Referring now to FIG. 4c, in some embodiments, the HUD module 115 may be responsible for also prioritizing the stacking order of co-equal objects within the same assigned level of object prioritization. For example, as shown in FIG. 4c, the primary focus 401 of the user 301 has shifted in FIG. 4c from the iPad (in FIG. 4b) to one of the mobile computing devices. As a result of the shift in the user's 301 primary focus 401, there are now multiple mobile computing devices that may be considered secondary objects 406a, 406b because they are categorically related to the mobile computing device of the primary object 403 and thus vying for priority within the stacking order of the z-index. Accordingly, the HUD module 115 may prioritize one or more objects within the same object classification (primary, secondary, tertiary, etc.) using one or more secondary factors. Examples of secondary factors that may be used to prioritize co-equal objects may include, but is not limited to the value of a promotional offer, relevance of the object to the user (i.e. preferred brands or previously bought brands), social relationships (i.e. the user's 301 friends have talked about one object over another), recommendations or reviews the user 301 may have read, user purchase history, cognitive state of the user (i.e. the system 100 may prioritize objects that may make the user 301 feel better, energized, cope, etc.), the surrounding environment (i.e. is it sunny, rainy, hot, cold, snowy, etc., and thus prioritize objects that may be more responsive or relevant to the current environment, for example clothing and accessories suitable for the current weather outside may be stacked higher in the stacking order when viewed through the augmented display system 103).

In the example of FIG. 4c, the primary focus 401 of the user 301 may be the Blackberry® mobile computing device. The prioritization of the co-equal secondary objects 406a, 406b, in this case an Apple iPhone® and the Samsung Galaxy®, may be prioritized based on secondary factors by the HUD module 115. As shown in FIG. 4c, in this example, the Apple iPhone® may be prioritized over the Samsung Galaxy based on either better promotional deal exhibited by the Apple iPhone®, which in this example costs $100 less or the determining factor in the prioritization may be due to the user's 301 previously viewing the Apple iPad® in FIG. 4b, which is also an Apple® product (i.e. based on viewing habits/brand interest). In some embodiments, the prioritization resulting in the secondary overlay 409a to be prioritized over secondary overlay 409b may have been a combination of multiple factors, including the cost savings of the Apple® promotion in combination with previously viewing other Apple® products in the past.

In some embodiments of the augmented display system 103, the AR prioritization module 105 may further comprise a speech recognition module 117. Embodiments of the speech recognition module 117 may access, control, receive and process voice commands in the form of audio data recorded by the audio recording system 126. Embodiments of the audio recording system 126 may comprise one or more microphones receiving audio data from a user 301. The user 301 may speak to the augmented display system 103 by speaking into one or more of the microphones. In some embodiments, the recorded audio input data may be transcribed by the speech recognition system 117 into text and scanned by the speech recognition for keywords and/or commands. Upon identifying one or more commands, the speech recognition system 117 may transmit the commands or audio inputs to one or more respective modules or the processor 116 for execution of said commands or inputs by the user 301. For example, the user 301 may implement voice commands via the audio recording system 126 to toggle the primary focus 401 or the prioritization of virtual overlays 407, 409, 411 being displayed by the HUD of the display device 110. As the user 301 inputs voice commands, the voice commands are recognized by the speech recognition module 126 as a command to toggle the prioritization or primary focus 401. The speech recognition module 117 may send a system call to the HUD module 115 directing the HUD module 115 to toggle the virtual overlays 407, 409, 411 and/or the primary focus 401 accordingly.

Referring to the drawings, FIG. 2a to FIG. 2d depict an embodiment of an augmented display system 103 which may be worn the user 301. As shown in the figures, the exemplary embodiment of the augmented display system 103 may be a pair of glasses comprising a frame 203, a pair of arms 205 each comprising a hinge and a pair of lenses 207. The frame 203, arms 205 and lenses 207 may be constructed out of any material known by a person skilled in the art of glasses construction. For example, the underlying components of the glasses of the augmented display system 103 may be constructed out of various plastics, resins, rubbers, metals or metal alloys, etc. While the exemplary embodiment of the augmented display system 103 may be depicted as glasses, this should in no way be limiting to the appearance that the augmented display system 103 may take. Glasses are merely one example and the augmented display system 103 may take other forms that comprise computer system capable of overlaying images or video data projected by the computer system onto a display device 110 having a HUD and GUI overlaid or juxtaposed within the vicinity of one or more objects 403, 405, 406 or digital representation 503, 505, 506, as an object is being viewed in real time by a visual recording system 124. For example, a mobile device or tablet computer shown in FIG. 3a-3b and FIG. 5 acting as an augmented display system 103 having a display device 110, visual recording system 124 and audio recording system 126 as shown.

The embodiment of the glasses used as an augmented display system 103 may include electrical and computing components integrated into the glasses themselves. For example, a projection device may be installed within the housing 201 attached to the frame 203 or arms 205 of the augmented display system 103 as shown in FIG. 2a-2d. Within the interior of the housing 201, the computer system components integrated therein may include any of the components described above for the augmented display system 103 and may integrate components of the generic computer system 900 of FIG. 9 discussed in detail below, including a processor 991, memory devices 994, 995 an input device 992 and an output device 993. Additional specialized hardware and software components that may be integrated into glasses embodiment may include the profile module 107, visual recognition module 108, display controller 109, overlay module 113, HUD module 115, speech recognition module 117, analytics module 119, display device 110, visual recording system 124 and audio recording system 126.

Method for Prioritizing a Stacking Order of a Z-Index

Figure 8:
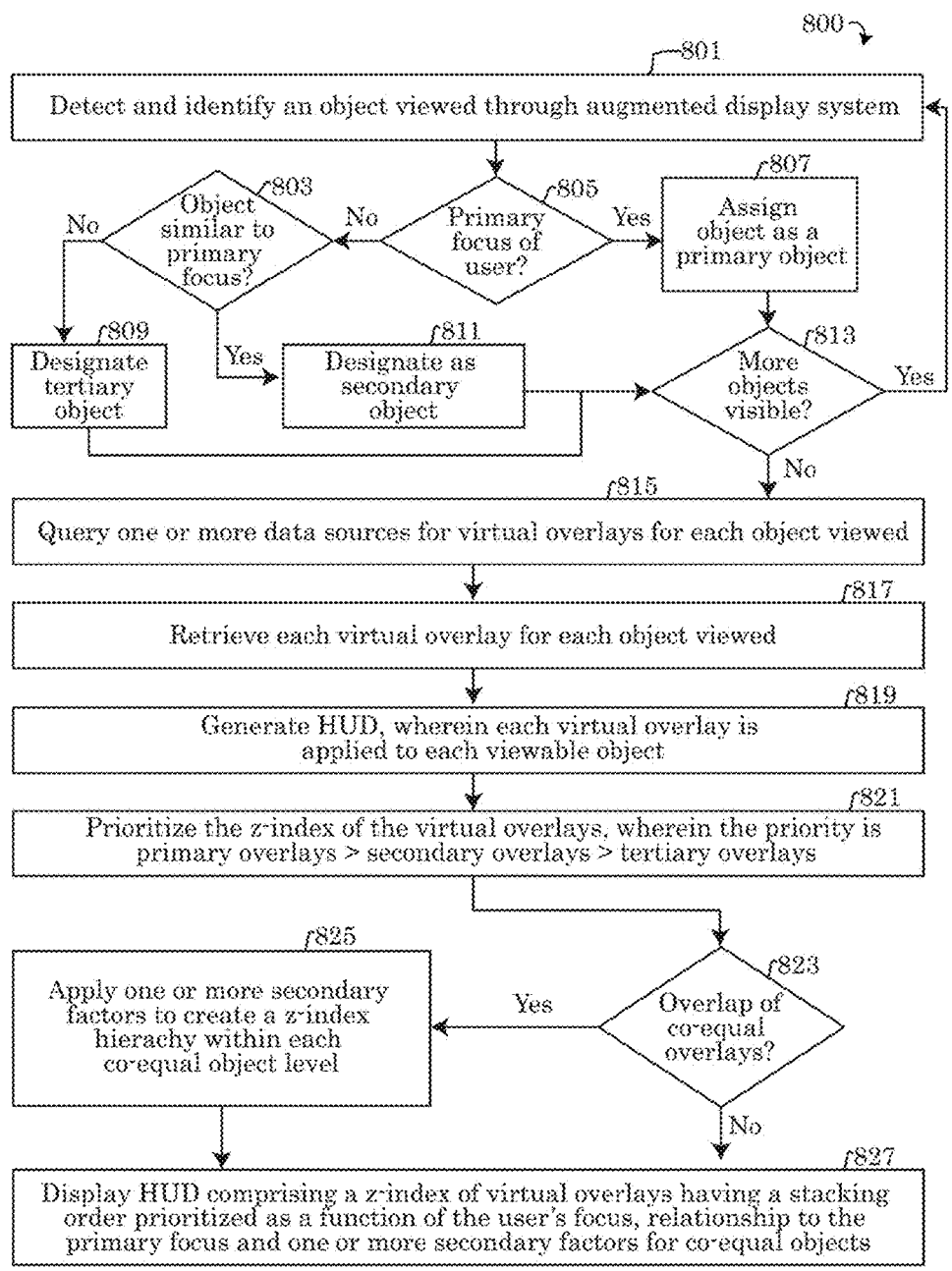
FIG. 8 depicts an embodiment of an algorithm for prioritizing a stacking order of a z-index of virtual overlays of augmented reality with the systems, devices, methods and tools described throughout the present disclosure.

The drawing of FIG. 8 represents an embodiment of an algorithm 800 that may be implemented for prioritizing a stacking order of a z-index of virtual overlays in an augmented display system 103, in accordance with the systems described in FIGS. 1-7 using one or more computer systems defined generically in FIG. 9 below, and more specifically by the specific embodiments depicted in FIGS. 1-7. A person skilled in the art should recognize that the steps of the method described in FIG. 8 may not require all of the steps disclosed herein to be performed, nor does the algorithm 800 of FIG. 8 necessarily require that all the steps be performed in the particular order presented. Variations of the method steps presented in FIG. 8 may be performed in a different order than presented.

The algorithm 800 described in FIG. 8 may describe a process for prioritizing a stacking order of a z-index using an augmented display system 103. The algorithm 800 may initiate in step 801 by detecting and identifying one or more objects viewed through the augmented display system 103. The detection and identification of each object may be made by the visual recognition module 108, which may be receiving images or video data streamed by one or more cameras of the visual recognition system 124. As the visual recognition module 108 receives the images and video data, the visual recognition module 108 may implement one or more object recognition techniques to detect and identify the objects currently within the frame of the image or video. Once an object has been detected by the visual recognition system 108, the algorithm 800 may proceed to step 805 and determine an objects' importance or relevance in the stacking order of the z-index.

In step 805, the visual recognition module 108 may begin the steps for determining a level of importance of each object detected in step 801. In step 805, a determination may be made by the visual recognition module 108 whether or not the detected object is a primary focus 401 of the user 301 using one or more techniques. For example, by automatically tracking the user's 301 gaze, the focus of one or more cameras in the visual recording system 124 or any manual object selections that a user may have chosen to focus on. If the detected object is an object of primary focus 401, the algorithm 800 may proceed to step 807, wherein the visual recognition module 108 may assign the object an identifier as a primary object 403. The algorithm 800 may proceed to step 813 and determine whether or not additional objects are detected and/or need an assignment of object type. If additional objects exist within the current viewing distance of the augmented display system 103, the algorithm may proceed back to step 801 and continue to identify the detected objects, otherwise the algorithm may proceed to step 815.

In step 805, the determination made by the visual recognition module 108 may be that the object detected and identified in step 801 is not the primary focus 401 of the user 301. The algorithm 800 may proceed to step 803 and make a second determination regarding whether or not the detected object in step 801 is similar in some way to an object of primary focus 401. For example, is the detected object a similar type, classification, category or functionality to the object of primary focus. If the object is similar in some manner, the algorithm 800 may proceed to step 811, wherein the object may be assigned a designation as a secondary object 406 by the visual recognition module 108. Likewise, if the object is found not to have a similar type, classification, categorization, etc. in step 803, the algorithm may proceed to step 809, wherein the visual recognition module 108 may assign the object a designation as a tertiary object 405. Once the objects have been designated with a classification in step 809 or 811, the algorithm may proceed to step 813 as described above.

In step 815, the system 100 may perform the step querying one or more data sources, such as an overlay data source 131, network repository 133 or local data storage device 118 for one or more available virtual overlays 407, 409, 411 corresponding to each object designated in step 807, 809 or 811 as described above. This querying step may be performed by the overlay module 113 in some embodiments. Subsequently, in response to the query results, the algorithm 800 may continue to retrieve each of the virtual overlays 407, 409, 411 from the one or more data sources. The virtual overlays 407, 409, 411 may be loaded into the memory device 114 of the augmented display system 103 or into an onboard memory device of the AR prioritization module 105 and/or a memory device integrated into one or more submodules thereof.

In step 819 of the algorithm 800, the HUD module 115 may begin generating and building a HUD comprising each virtual overlay 407, 409, 411 retrieved from the one or more data sources in step 819. In step 421, the HUD module 115 may prioritize the stacking order of the z-index for the HUD being generated by the system in step 819. The HUD module 115 may prioritize the stacking order in manner such that the z-index assigns primary overlays 407 as the highest priority followed by the secondary overlays 409 and the tertiary overlays 411 are assigned the lowest priority.

Embodiments of the algorithm 800 may cross check each of the primary objects 403, secondary objects 406 or tertiary objects 405 to determine if there are multiple co-equal objects within one or more object classifications. In step 823 of the algorithm 800, the HUD module 115 may determine whether any co-equally classified objects or overlays thereof overlap. If there is an overlap between objects of a co-equal classification, the algorithm 800 may proceed to step 825, wherein the HUD module 115 applies one or more secondary factors to create a z-index hierarchy within each co-equal object level. Once all co-equal objects have been prioritized within the stacking order of the z-index, the algorithm may proceed to step 825. Likewise, if in step 823, there is not an overlay of co-equal object overlays, the algorithm 800 may skip step 825 and proceed directly to step 827. In step 827, the HUD generated in step 819 comprising a prioritized set of virtual overlays 407, 409, 411 in steps 821-825 and the HUD may be displayed on the display device 110 of the augmented display system 103.

Computer System

Figure 9:
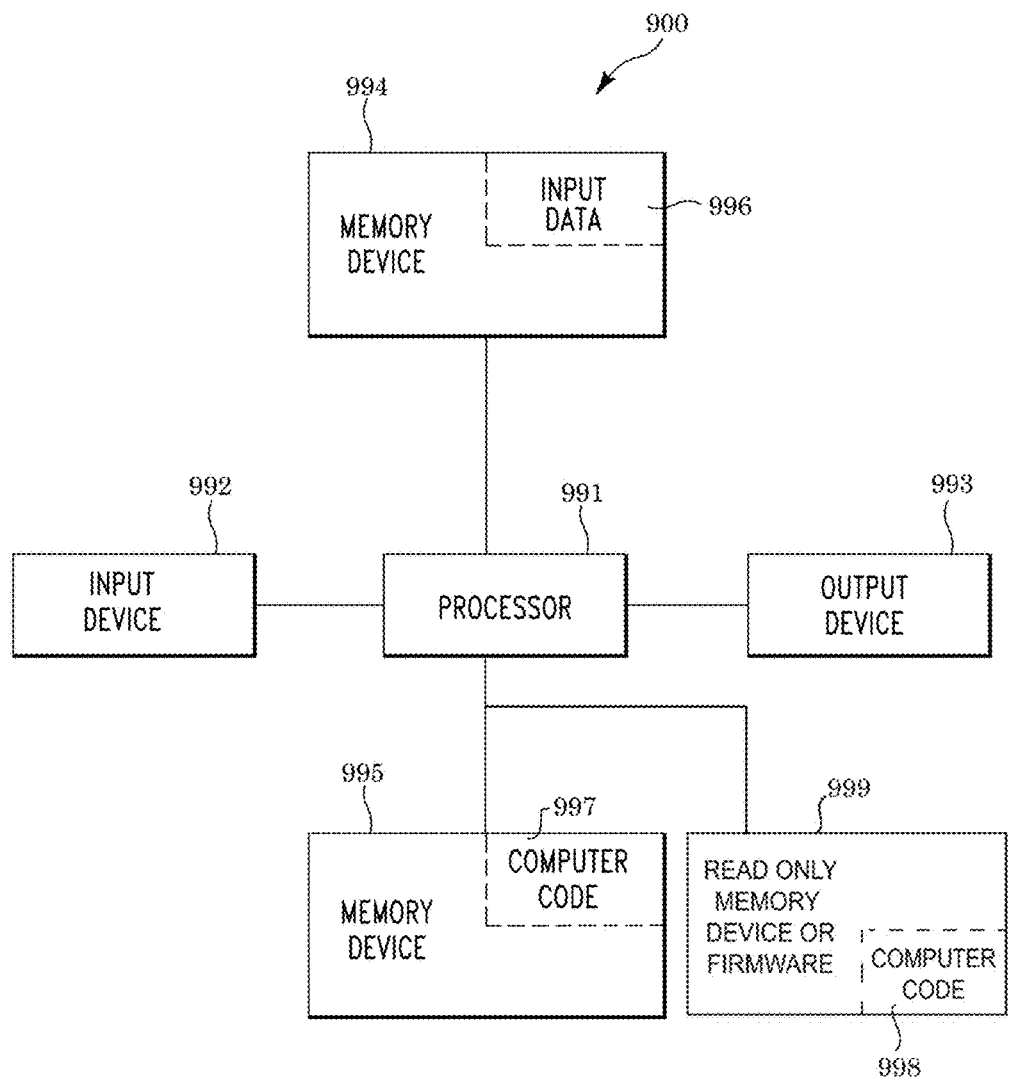
FIG. 9 depicts a block diagram of a computer system able to implement the methods for prioritizing a stacking order of a z-index of virtual overlays of augmented reality, consistent with the disclosure of the present application.

Referring to the drawings, FIG. 9 illustrates a block diagram of a computer system 900 that may be included in the systems of FIGS. 1-7 and for implementing methods for prioritizing a stacking order of a z-index of virtual overlays of augmented reality in accordance with the embodiments described in the present disclosure. The computer system 900 may generally comprise a processor 991, otherwise referred to as a central processing unit (CPU), an input device 992 coupled to the processor 991, an output device 993 coupled to the processor 991, and memory devices 994 and 995 each coupled to the processor 991. The input device 992, output device 993 and memory devices 994, 995 may each be coupled to the processor 991 via a bus. Processor 991 may perform computations and control the functions of computer 900, including executing instructions included in the computer code 997 for tools and programs for prioritizing a stacking order of a z-index of virtual overlays of augmented reality, in the manner prescribed by the embodiments of the disclosure using the systems of FIGS. 1-7, wherein the instructions of the computer code 997 may be executed by processor 991 via memory device 995. The computer code 997 may include software or program instructions that may implement one or more algorithms for implementing the methods for prioritizing a stacking order of a z-index of virtual overlays of augmented reality, as described in detail above. The processor 991 executes the computer code 997. Processor 991 may include a single processing unit, or may be distributed across one or more processing units in one or more locations (e.g., on a client and server).

The memory device 994 may include input data 996. The input data 996 includes any inputs required by the computer code 997, 998. The output device 993 displays output from the computer code 997, 998. Either or both memory devices 994 and 995 may be used as a computer usable storage medium (or program storage device) having a computer readable program embodied therein and/or having other data stored therein, wherein the computer readable program comprises the computer code 997, 998. Generally, a computer program product (or, alternatively, an article of manufacture) of the computer system 900 may comprise said computer usable storage medium (or said program storage device).

Memory devices 994, 995 include any known computer readable storage medium, including those described in detail below. In one embodiment, cache memory elements of memory devices 994, 995 may provide temporary storage of at least some program code (e.g., computer code 997, 998) in order to reduce the number of times code must be retrieved from bulk storage while instructions of the computer code 997, 998 are executed. Moreover, similar to processor 991, memory devices 994, 995 may reside at a single physical location, including one or more types of data storage, or be distributed across a plurality of physical systems in various forms. Memory devices 994, 995 can include data distributed across, for example, a local area network (LAN) or a wide area network (WAN). Further, memory devices 994, 995 may include an operating system (not shown) and may include other systems not shown in the figures.

In some embodiments, rather than being stored and accessed from a hard drive, optical disc or other writeable, rewriteable, or removable hardware memory device 994, 995, stored computer program code 998 (e.g., including algorithms) may be stored on a static, non-removable, read-only storage medium such as a Read-Only Memory (ROM) device 999, or may be accessed by processor 991 directly from such a static, non-removable, read-only medium 999. Similarly, in some embodiments, stored computer program code 997 may be stored as computer-readable firmware 999, or may be accessed by processor 991 directly from such firmware 999, rather than from a more dynamic or removable hardware data-storage device 995, such as a hard drive or optical disc.

In some embodiments, the computer system 900 may further be coupled to an input/output (I/O) interface 112 and a computer data storage unit (for example a data store, data mart or repository). An I/O interface 112 may include any system for exchanging information to or from an input device 992 or output device 993. The input device 992 may be, inter alia, a keyboard, joystick, trackball, touchpad, mouse, sensors, beacons, RFID tags, audio recording system 126 including one or more microphones, biometric input device, visual recording system 124 comprising a camera system, a timer, etc. The output device 993 may be, inter alia, a printer, a plotter, a display device 110 (such as a computer screen, monitor or device capable of projecting an image thereon), a magnetic tape, a removable hard disk, a floppy disk, etc. The memory devices 994 and 995 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 900, and may include any type of transmission link, including electrical, optical, wireless, etc.

The I/O interface 112 may allow the computer system 900 to store information (e.g., data or program instructions such as program code 997, 998) on and retrieve the information from a computer data storage unit (not shown in FIG. 9). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to prioritizing a stacking order of a z-index of virtual overlays of augmented reality. Thus, an embodiment of the present invention discloses a process for supporting computer infrastructure, where the process includes providing at least one support service for at least one of integrating, hosting, maintaining and deploying computer-readable code (e.g., program code 997, 998) in a computer system (e.g., computer 800) including one or more processor(s) 991, wherein the processor(s) carry out instructions contained in the computer code 997 causing the computer system to prioritize a z-index of augmented reality overlays. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for prioritizing a stacking order of a z-index of virtual overlays of augmented reality. Thus the present invention discloses a process for supporting, deploying and/or integrating computer infrastructure, integrating, hosting, maintaining, and deploying computer-readable code into the computer system 900, wherein the code in combination with the computer system 900 is capable of performing a method of prioritizing a stacking order of a z-index of virtual overlays of augmented reality.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user 310's computer, partly on the user 310's computer, as a stand-alone software package, partly on the user 310's computer and partly on a remote computer or entirely on the remote computer or server. In the latter scenario, the remote computer may be connected to the user 310's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for prioritizing a stacking order of a z-index of virtual overlays in an augmented display system comprising the steps of:
    determining, by a processor, a primary focus of a user operating an augmented display system;
    detecting, by the processor, one or more objects viewed through the augmented display system;
    designating, by the processor, each of the one or more objects as a primary object or a secondary object as a function of the primary focus of the user;
    retrieving, by the processor, the virtual overlays from one or more data sources corresponding to each primary object and secondary object;
    assigning, by the processor, the stacking order for each of the virtual overlays in the z-index of a heads-up display (HUD) of the augmented display system generated by the processor, wherein a stacking order of the virtual overlays of the primary object is higher than a stacking order of the virtual overlays of each secondary object; and
    displaying, by the processor, each of the virtual overlays in the z-index of the HUD in accordance with the stacking order assigned, and juxtaposing each of the virtual overlays near each corresponding primary object or secondary object.

2. The method of claim 1, wherein the stacking order of two or more virtual overlays of secondary objects are further assigned as a function of secondary factors selected from the group consisting of relevance to the user, social relationship, purchase history, environment, cognitive state and value.

3. The method of claim 1, wherein the stacking order of two or more virtual overlays are assigned as a function of a value of a promotion, wherein a promotion having a highest promotional value is stacked highest in the stacking order and the stacking order dynamically adjusts based on the value of the promotion as the value of the promotion changes in real time.

4. The method of claim 1, wherein the stacking order of two or more virtual overlays are assigned as a function of brand preference to the user, wherein more preferable brands are stacked higher in the stacking order than less preferable brands.

5. The method of claim 1, wherein the stacking order of two or more virtual overlays are assigned as a function of a surrounding environment, wherein a primary object or secondary object that is more relevant to the surrounding environment is stacked higher in the stacking order.

6. The method of claim 1, wherein the stacking order of two or more virtual overlays are assigned as a function of a cognitive state of the user and virtual overlays corresponding to a primary object or secondary object more relevant to the user's cognitive state is stacked higher in the stacking order.

7. The method of claim 1, further comprises the steps of:
    recording, by a camera of a visual recording system, video or images of the primary object or the secondary object to a display device; and
    the step of displaying further comprises displaying the recorded video or images of the primary object or the secondary object as virtual representations on the display device as part of the HUD.

8. The method of claim 1, further comprising providing at least one support service for at least one of creating, integrating, hosting, maintaining, and deploying computer-readable program code in a computer system, where the computer-readable program code in combination with the computer system is configured to implement the steps of determining, detecting, designating, retrieving, assigning, and displaying.

9. A computer system, comprising:
    a processor;
    a memory device coupled to the processor;
    a visual recording system comprising a camera, coupled to the processor;
    a display device, coupled to the processor; and
    a computer readable storage device coupled to the processor, wherein the storage device contains program code executable by the processor via the memory device to implement a method for prioritizing a stacking order of a z-index of virtual overlays comprising the steps of:
        determining, by the processor, a primary focus of a user operating an augmented display system;
        detecting, by the processor, one or more objects viewed through the augmented display system;
        designating, by the processor, each of the one or more objects as a primary object or a secondary object as a function of the primary focus of the user;
        retrieving, by the processor, the virtual overlays from one or more data sources corresponding to each primary object and secondary object;
        assigning, by the processor, the stacking order for each of the virtual overlays in the z-index of a heads-up display (HUD) of the augmented display system generated by the processor, wherein a stacking order of the virtual overlays of the primary object is higher than a stacking order of the virtual overlays of each secondary object; and displaying, by the processor, each of the virtual overlays in the z-index of the HUD in accordance with the stacking order assigned, and juxtaposing each of the virtual overlays near each corresponding primary object or secondary object.

10. The computer system of claim 9, wherein the stacking order of two or more virtual overlays of secondary objects are further assigned as a function of secondary factors selected from the group consisting of relevance to the user, social relationship, purchase history, environment, cognitive state and value.

11. The computer system of claim 9, wherein the stacking order of two or more virtual overlays are assigned as a function of a value of a promotion, wherein a promotion having a highest promotional value is stacked highest in the stacking order and the stacking order dynamically adjusts based on the value of the promotion as the value of the promotion changes in real time.

12. The computer system of claim 9, wherein the stacking order of two or more virtual overlays are assigned as a function of brand preference to the user, wherein more preferable brands are stacked higher in the stacking order than less preferable brands.

13. The computer system of claim 9, wherein the stacking order of two or more virtual overlays are assigned as a function of a surrounding environment, wherein a primary object or secondary object that is more relevant to the surrounding environment is stacked higher in the stacking order.

14. The computer system of claim 9, further comprises:
recording, by the camera of the visual recording system, video or images of the primary object or the secondary object to the display device; and
displaying further comprises displaying the recorded video or images of the primary object or secondary object as virtual representations on the display device as part of the HUD.

15. The computer system of claim 9, wherein the primary objects and secondary objects are re-designated and the stacking order of the virtual overlays are dynamically reassigned as a function of a change in the primary focus of a user.

16. A computer program product comprising:
one or more computer readable hardware storage devices having computer readable program code stored therein, said program code containing instructions executable by the one or more central processing units (CPU) of a computer system implementing a method for comparing products using augmented reality comprising the steps of:

determining, by the CPU, a primary focus of a user operating an augmented display system;

detecting, by the CPU, one or more objects viewed through the augmented display system;

designating, by the CPU, each of the one or more objects as a primary object or a secondary object as a function of the primary focus of the user;

retrieving, by the CPU, the virtual overlays from one or more data sources corresponding to each primary object and secondary object;

assigning, by the CPU, a stacking order for each of the virtual overlays in a z-index of a heads-up display (HUD) of the augmented display system generated by the CPU, wherein a stacking order of the virtual overlays of the primary object is higher than a stacking order of the virtual overlays of each secondary object; and displaying, by the CPU, each of the virtual overlays in the z-index of the HUD in accordance with the stacking order assigned, and juxtaposing each of the virtual overlays near each corresponding primary object or secondary object.

17. The computer program product of claim 16, further comprising:
recording by a camera of a visual recording system video or images of the primary object or the secondary object to a display device; and
the step of displaying further comprises displaying the recorded video or images of the primary object or secondary object as virtual representations on the display device as part of the HUD.

18. The computer program product of claim 16, wherein the stacking order of two or more virtual overlays are assigned as a function of a value of a promotion, wherein a promotion having a highest promotional value is stacked highest in the stacking order and the stacking order dynamically adjusts based on the value of the promotion as the value of the promotion changes in real time.

19. The computer program product of claim 16, wherein the stacking order of two or more virtual overlays are assigned as a function of brand preference to the user, wherein more preferable brands are stacked higher in the stacking order than less preferable brands.

20. The computer program product of claim 16, wherein the stacking order of two or more virtual overlays are assigned as a function of a surrounding environment, wherein a primary object or secondary object that is more relevant to the surrounding environment is stacked higher in the stacking order.

* * * * *

UNITED STATES PATENT AND TRADEMARK OFFICE
CERTIFICATE OF CORRECTION

PATENT NO. : 10,565,761 B2  
APPLICATION NO. : 15/834125  
DATED : February 18, 2020  
INVENTOR(S) : Lisa A. Seacat DeLuca et al.

Page 1 of 1

It is certified that error appears in the above-identified patent and that said Letters Patent is hereby corrected as shown below:

In the Claims

Claim 16, Column 26, Line 8, delete "the virtual overlays" and replace with -- virtual overlays --.

Signed and Sealed this
Twelfth Day of May, 2020

Andrei Iancu
*Director of the United States Patent and Trademark Office*